US012472349B2

(12) United States Patent
Wah et al.

(10) Patent No.: US 12,472,349 B2
(45) Date of Patent: Nov. 18, 2025

(54) NEUROSTIMULATION RESPONSIVE TO POSTURE

(71) Applicant: Saluda Medical Pty Ltd, Level 1 (AU)

(72) Inventors: James Hamilton Wah, Artarmon (AU); Amol Malla, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 384 days.

(21) Appl. No.: 18/023,340

(22) PCT Filed: Aug. 30, 2021

(86) PCT No.: PCT/AU2021/050999
§ 371 (c)(1),
(2) Date: Feb. 24, 2023

(87) PCT Pub. No.: WO2022/040757
PCT Pub. Date: Mar. 3, 2022

(65) Prior Publication Data
US 2023/0310843 A1 Oct. 5, 2023

(30) Foreign Application Priority Data
Aug. 28, 2020 (AU) .................... 2020903082
Aug. 28, 2020 (AU) .................... 2020903083

(51) Int. Cl.
*A61N 1/05* (2006.01)
*A61B 5/00* (2006.01)
(Continued)

(52) U.S. Cl.
CPC ............ *A61N 1/0551* (2013.01); *A61B 5/311* (2021.01); *A61B 5/388* (2021.01); *A61B 5/6847* (2013.01);
(Continued)

(58) Field of Classification Search
CPC ............ A61N 1/0551; A61N 1/36125; A61N 1/36139; A61N 1/36157; A61N 1/36067;
(Continued)

(56) References Cited

U.S. PATENT DOCUMENTS 5,088,488 A 2/1992 Markowitz et al.
5,913,882 A 6/1999 King
(Continued)

FOREIGN PATENT DOCUMENTS

DE 19758110 B4 7/2004
WO WO2006055849 A1 5/2006
(Continued)

OTHER PUBLICATIONS

Kent, Characterization of Evoked Potentials During Deep Brain Stimulation in the Thalamus. Dissertation, Duke University. (2013) Retrieved from https://hdl.handle.net/10161/8195, 320 pages.
(Continued)

*Primary Examiner* — Paula J Stice
(74) *Attorney, Agent, or Firm* — Barnes & Thornburg LLP

(57) ABSTRACT

An implantable device is configured to control application of a neural stimulus as defined by a stimulus parameter; measure via the measurement circuitry a characteristic of a neural compound action potential response evoked by the stimulus; and compute, using the stimulus parameter and the measured characteristic of the evoked neural compound action potential response, a characteristic of an evoked response that would be obtained from the neural stimulus if the patient were in a reference posture. A posture of the patient can be estimated from the computed characteristic and/or the computed characteristic can be used as a feedback variable of a feedback loop. Multidimensional histograms of
(Continued)

datasets comprising at least one of the stimulus parameter and a feedback variable can be stored.

16 Claims, 20 Drawing Sheets

(51) Int. Cl.
    *A61B 5/311*     (2021.01)
    *A61B 5/388*     (2021.01)
    *A61N 1/36*     (2006.01)

(52) U.S. Cl.
    CPC ..... *A61N 1/36125* (2013.01); *A61N 1/36139* (2013.01); *A61N 1/36157* (2013.01)

(58) Field of Classification Search
    CPC ............ A61N 1/36075; A61N 1/36062; A61N 1/36071; A61N 1/36132; A61B 5/311; A61B 5/388; A61B 5/6847; A61B 5/1116
    See application file for complete search history.

(56) References Cited

U.S. PATENT DOCUMENTS

| | | | |
|---|---|---|---|
| 7,295,881 | B2 | 11/2007 | Cohen et al. |
| 7,450,992 | B1 | 11/2008 | Cameron |
| 8,396,554 | B2 | 3/2013 | Miesel et al. |
| 8,688,221 | B2 | 4/2014 | Miesel et al. |
| 8,762,065 | B2 | 6/2014 | Dilorenzo |
| 9,149,210 | B2 | 10/2015 | Sahasrabudhe et al. |
| 9,205,263 | B2 | 12/2015 | King et al. |
| 9,302,112 | B2 | 4/2016 | Bornzin et al. |
| 9,386,934 | B2 | 7/2016 | Parker et al. |
| 9,387,325 | B1 | 7/2016 | Min et al. |
| 9,492,667 | B1 | 11/2016 | Kent et al. |
| 9,511,231 | B1 | 12/2016 | Kent et al. |
| 9,737,719 | B2 | 8/2017 | Skelton et al. |
| 9,907,960 | B2 | 3/2018 | Lian et al. |
| 9,950,171 | B2 | 4/2018 | Johanek et al. |
| 10,426,409 | B2 | 10/2019 | Single |
| 10,471,264 | B2 | 11/2019 | Bourget et al. |
| 10,842,996 | B2 | 11/2020 | Baru et al. |
| 11,090,493 | B2 | 8/2021 | Hou et al. |
| 11,179,091 | B2 | 11/2021 | Karantonis et al. |
| 11,259,732 | B2 | 3/2022 | Parramon et al. |
| 11,273,311 | B2 | 3/2022 | Su |
| 11,684,774 | B2 | 6/2023 | Crosby et al. |
| 11,779,765 | B2 * | 10/2023 | Dinsmoor .......... A61N 1/36125 607/59 |
| 11,786,725 | B2 | 10/2023 | Beck et al. |
| 2003/0153959 | A1 | 8/2003 | Thacker et al. |
| 2013/0165998 | A1 | 6/2013 | Libbus et al. |
| 2014/0236257 | A1 | 8/2014 | Parker et al. |
| 2014/0243926 | A1 | 8/2014 | Carcieri |
| 2014/0277282 | A1 | 9/2014 | Jaax |
| 2015/0360031 | A1 | 12/2015 | Bornzin et al. |
| 2016/0082265 | A1 | 3/2016 | Moffitt et al. |
| 2016/0303376 | A1 | 10/2016 | Dinsmoor et al. |
| 2017/0361101 | A1 | 12/2017 | Single |
| 2018/0078769 | A1 | 3/2018 | Dinsmoor et al. |
| 2019/0168000 | A1 | 6/2019 | Laird-Wah |
| 2019/0192855 | A1 | 6/2019 | Bharmi et al. |
| 2021/0016091 | A1 | 1/2021 | Parker et al. |
| 2021/0345950 | A1 | 11/2021 | Annoni et al. |
| 2021/0379386 | A1 | 12/2021 | Parker et al. |
| 2021/0393964 | A1 | 12/2021 | Single et al. |
| 2022/0039724 | A1 | 2/2022 | Parker et al. |
| 2022/0054843 | A1 | 2/2022 | Carcieri |
| 2023/0067424 | A1 | 3/2023 | Crosby et al. |
| 2023/0241397 | A1 | 8/2023 | Parker et al. |
| 2023/0321438 | A1 | 10/2023 | Sachs et al. |
| 2023/0321439 | A1 | 10/2023 | Sachs et al. |

FOREIGN PATENT DOCUMENTS

| | | |
|---|---|---|
| WO | WO2006017277 A3 | 6/2006 |
| WO | WO2007064936 A1 | 6/2007 |
| WO | WO2009015005 A1 | 1/2009 |
| WO | WO2009046764 A1 | 4/2009 |
| WO | WO2009051965 A1 | 4/2009 |
| WO | WO2010080222 A1 | 7/2010 |
| WO | WO2010088417 A1 | 8/2010 |
| WO | WO2011112773 A3 | 12/2011 |
| WO | WO2011159545 A2 | 12/2011 |
| WO | WO2012115183 A1 | 8/2012 |
| WO | WO2012155185 A1 | 11/2012 |
| WO | WO2012155187 A1 | 11/2012 |
| WO | WO2012155188 A1 | 11/2012 |
| WO | WO2012155189 A1 | 11/2012 |
| WO | WO2013063111 A1 | 5/2013 |
| WO | WO2015031136 A1 | 3/2015 |
| WO | WO2015074121 A1 | 5/2015 |
| WO | WO2016057212 A1 | 4/2016 |
| WO | WO2016057544 A1 | 4/2016 |
| WO | WO2016090436 A1 | 6/2016 |
| WO | WO2017173493 A1 | 10/2017 |
| WO | WO2017184238 A1 | 10/2017 |
| WO | WO2017219096 A1 | 12/2017 |
| WO | WO2018063912 A1 | 4/2018 |
| WO | WO2018080753 A1 | 5/2018 |
| WO | WO2018089981 A1 | 5/2018 |
| WO | WO2018152064 A1 | 8/2018 |
| WO | WO2019027578 A1 | 2/2019 |
| WO | WO2019067059 A1 | 4/2019 |
| WO | WO2019070406 A1 | 4/2019 |
| WO | WO2019136072 A1 | 7/2019 |
| WO | WO2019177798 A1 | 9/2019 |
| WO | WO2019178634 A1 | 9/2019 |
| WO | WO2019190710 A1 | 10/2019 |
| WO | WO2019204884 A1 | 10/2019 |
| WO | WO2019190679 A3 | 12/2019 |
| WO | WO2019246579 A1 | 12/2019 |
| WO | WO2019246582 A1 | 12/2019 |
| WO | WO2020047152 A1 | 3/2020 |
| WO | WO2020082118 A1 | 4/2020 |
| WO | WO2020082126 A1 | 4/2020 |
| WO | WO2020087135 A1 | 5/2020 |
| WO | WO2020124135 A1 | 6/2020 |
| WO | WO2020206152 A1 | 10/2020 |
| WO | WO2020243096 A1 | 12/2020 |
| WO | WO2020251899 A1 | 12/2020 |
| WO | WO2020257705 A1 | 12/2020 |
| WO | WO2021030152 A1 | 2/2021 |
| WO | WO2021080834 A1 | 4/2021 |
| WO | WO2021080835 A1 | 4/2021 |
| WO | WO2021080836 A1 | 4/2021 |
| WO | WO2021126431 A1 | 6/2021 |
| WO | WO2021126432 A1 | 6/2021 |
| WO | WO2021126587 A1 | 6/2021 |
| WO | WO2021126588 A1 | 6/2021 |
| WO | WO2021162794 A1 | 8/2021 |
| WO | WO2021162795 A1 | 8/2021 |
| WO | WO2021178265 A1 | 9/2021 |
| WO | WO2021211170 A1 | 10/2021 |
| WO | WO2021252257 A1 | 12/2021 |
| WO | WO2021262861 A1 | 12/2021 |
| WO | WO2022010677 A1 | 1/2022 |
| WO | WO2021255473 A3 | 2/2022 |

OTHER PUBLICATIONS

Gorman et al., "Neural Recordings for Feedback Control of Spinal Cord Stimulation: Reduction of Paresthesia Variability", 2013, presented at the International Neuromodulation Society 11th World Congress, Berlin, Germany, 2 pgs.

Kent, "Characterization of Evoked Potentials During Deep Brain Stimulation in the Thalamus", 2013, Dissertation, Duke University. Retrieved from https://hdl.handle.net/10161/8195.

Laird-Wah, J., "Improving Spinal Cord Stimulation: Model-Based Approaches to Evoked Response Telemetry", UNSW Thesis, Aug. 2015, 279 pgs.

(56) References Cited

OTHER PUBLICATIONS

Parker et al., "Closing the Loop in Neuromodulation Therapies: Spinal Cord Evoked Compound Action Potentials During Stimulation for Pain Management (230)", Presented at the North American Neuromodulation Society, Las Vegas, 2011, in 15th Annual Meeting, North American Neuromodulation Society, p. 48.

* cited by examiner

NEUROSTIMULATION RESPONSIVE TO POSTURE

CROSS-REFERENCE TO RELATED APPLICATIONS

This application is a U.S. National Stage Patent Application of PCT Application No. PCT/AU2021/050999, filed Aug. 30, 2021, which claims the benefit of Australian Provisional Patent Application No. 2020903082 and Australian Provisional Patent Application No. 2020903083, both filed Aug. 28, 2020, both of which are incorporated herein by reference.

TECHNICAL FIELD

The present invention relates to controlling a neural response to a stimulus, and in particular relates to measurement of a compound action potential by using one or more electrodes implanted proximal to the neural pathway. This may be in order to improve feedback to control subsequently applied stimuli, and/or to assess impacts of postural changes.

BACKGROUND OF THE INVENTION

There are a range of situations in which it is desirable to apply neural stimuli in order to give rise to an evoked compound action potential (ECAP) and/or to alter neural function. For example, neuromodulation is used to treat a variety of disorders including chronic neuropathic pain, Parkinson's disease, and migraine. A neuromodulation system applies an electrical pulse to neural tissue in order to generate a therapeutic effect.

When used to relieve neuropathic pain originating in the trunk and limbs, the electrical pulse is applied to the dorsal column (DC) of the spinal cord, referred to as spinal cord stimulation (SCS). Such a system typically comprises an implanted electrical pulse generator, and a power source such as a battery that may be rechargeable by transcutaneous inductive transfer. An electrode array is connected to the pulse generator, and is positioned adjacent the target neural pathway(s). An electrical pulse applied to the neural pathway by an electrode causes the depolarisation of neurons, and generation of propagating action potentials. The fibres being stimulated in this way inhibit the transmission of pain from that segment in the spinal cord to the brain. To sustain the pain relief effects, stimuli are applied substantially continuously, for example at a frequency in the range of 30 Hz-100 Hz.

For effective and comfortable operation, it is necessary to maintain stimuli amplitude or delivered charge above a recruitment threshold. Stimuli below the recruitment threshold will fail to recruit any action potentials. It is also necessary to apply stimuli which are below a comfort threshold, above which uncomfortable or painful percepts arise due to increasing recruitment of Aβ fibres which when recruitment is too large produce uncomfortable sensations and at high stimulation levels may even recruit sensory nerve fibres associated with acute pain, cold and pressure sensation. In almost all neuromodulation applications, a single class of fibre response is desired, but the stimulus waveforms employed can recruit action potentials on other classes of fibres which cause unwanted side effects. The task of maintaining appropriate neural recruitment is made more difficult by electrode migration and/or postural changes of the implant recipient, either of which can significantly alter the neural recruitment arising from a given stimulus, depending on whether the stimulus is applied before or after the change in electrode position or user posture. There is room in the epidural space for the electrode array to move, and such array movement alters the electrode-to-fibre distance and thus the recruitment efficacy of a given stimulus. Moreover, the spinal cord itself can move within the cerebrospinal fluid (CSF) with respect to the dura. During postural changes the amount of CSF and the distance between the spinal cord and the electrode can change significantly. This effect is so large that postural changes alone can cause a previously comfortable and effective stimulus regime to become either ineffectual or painful.

Another control problem, facing neuromodulation systems of all types, is achieving neural recruitment at a sufficient level required for therapeutic effect, but at minimal expenditure of energy. The power consumption of the stimulation paradigm has a direct effect on battery requirements which in turn affects the device's physical size and lifetime. For rechargeable systems, increased power consumption results in more frequent charging and, given that batteries only permit a limited number of charging cycles, ultimately this reduces the implanted lifetime of the device.

Attempts have been made to address such problems by way of feedback, such as by way of the methods set forth in International Patent Publication No. WO 2012/155188 by the present applicant. Feedback seeks to compensate for nerve and/or electrode movement by controlling the delivered stimuli so as to maintain a constant ECAP amplitude. A functional feedback loop can also produce useful data for live operation and/or post-analysis, such as observed neural response amplitude and applied stimulus current, however device operation at tens of Hz over the course of hours or days quickly produces large volumes of such data which far exceed an implanted device's data storage and/or data transmission capacities.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect the present invention provides an implantable device for controllably applying a neural stimulus, the device comprising:
  a plurality of electrodes including one or more stimulus electrodes and one or more sense electrodes;
  a stimulus source for providing a stimulus to be delivered from the one or more stimulus electrodes to a neural pathway of a patient in order to give rise to an evoked action potential on the neural pathway;

measurement circuitry for recording a neural compound action potential signal sensed at the one or more sense electrodes; and a control unit configured to:
control application of a neural stimulus as defined by a stimulus parameter;
measure via the measurement circuitry a characteristic of a neural compound action potential response evoked by the stimulus;
compute, using the stimulus parameter and the measured characteristic of the evoked neural compound action potential response, a characteristic of an evoked response that would be obtained from the neural stimulus if the patient were in a reference posture; and
estimate a posture of the patient from the computed characteristic.

According to a second aspect the present invention provides an automated method of controlling a neural stimulus, the method comprising:
applying the neural stimulus to a neural pathway of a patient in order to give rise to an evoked action potential on the neural pathway, the stimulus being defined by a stimulus parameter;
measuring a characteristic of a neural compound action potential response evoked by the stimulus;
computing, using the stimulus parameter and the measured characteristic of the evoked neural compound action potential response, a characteristic of an evoked response that would be obtained from the neural stimulus if the patient were in a reference posture; and
estimating a posture of the patient from the computed characteristic.

According to a third aspect the present invention provides an implantable device for controllably applying a neural stimulus, the device comprising:
a plurality of electrodes including one or more stimulus electrodes and one or more sense electrodes;
a stimulus source for providing a stimulus to be delivered from the one or more stimulus electrodes to a neural pathway of a patient in order to give rise to an evoked action potential on the neural pathway;
measurement circuitry for recording a neural compound action potential signal sensed at the one or more sense electrodes; and
a control unit configured to:
control application of a neural stimulus as defined by a stimulus parameter;
measure via the measurement circuitry a characteristic of a neural compound action potential response evoked by the stimulus;
compute, using the stimulus parameter and the measured characteristic of the evoked neural compound action potential response, a characteristic of an evoked response that would be obtained from the neural stimulus if the patient were in a reference posture; and
implement a feedback controller which completes a feedback loop, the feedback controller using the computed characteristic as a feedback variable to control the stimulus parameter so as to maintain the feedback variable at a setpoint.

According to a fourth aspect the present invention provides an automated method of controlling a neural stimulus, the method comprising:
applying the neural stimulus to a neural pathway of a patient in order to give rise to an evoked action potential on the neural pathway, the stimulus being defined by a stimulus parameter;
measuring a characteristic of a neural compound action potential response evoked by the stimulus;
computing from the measured characteristic of the evoked neural compound action potential response and the stimulus parameter a characteristic of an evoked response that would be obtained from the neural stimulus if the patient were in a reference posture; and
completing a feedback loop by using the computed characteristic as a feedback variable to control the stimulus parameter so as to maintain the feedback variable at a setpoint.

In some embodiments of the invention the estimate of posture comprises a ratio of a measured amplitude of the neural compound action potential response to the computed characteristic, the computed characteristic comprising an amplitude of an evoked response that would be obtained from the neural stimulus if the patient were in the reference posture.

Some embodiments of the invention implement, using the computed characteristic as a feedback variable, a feedback controller which completes a feedback loop, the feedback controller configured to control the stimulus parameter so as to maintain the feedback variable at a setpoint.

Some embodiments of the invention implement, using the measured characteristic as a feedback variable, a feedback controller which completes a feedback loop, the feedback controller configured to control the stimulus parameter so as to maintain the feedback variable at a setpoint.

In some embodiments of the invention the control unit is further configured to determine a variation in recruitment across postures from the posture estimate.

In some embodiments of the invention, computing the characteristic comprises solving $C=(\hat{V}/M_0+T_0)^k\hat{V}$ for $\hat{V}$, where $\hat{V}$ is the computed characteristic and comprises a computed amplitude, $C=I^k V$, I is the stimulus parameter, V is the measured characteristic of the evoked neural compound action potential response, and $M_0$ and $T_0$ are parameters of a growth curve of the patient in the reference posture.

In some embodiments of the invention the feedback controller is configured to use the estimate of posture to control the stimulus parameter.

In some embodiments of the invention the feedback controller is configured to use the estimate of posture to estimate a distance between the electrodes and the neural pathway.

In some embodiments of the invention the feedback controller is configured to estimate the distance by scaling the estimate of posture by the distance between the electrodes and the neural pathway in the reference posture.

In some embodiments the feedback variable is an amplitude measure of an observed ECAP (V), and the estimate of patient posture comprises the inverse of the amplitude measure ($V^{-1}$), or any suitable function thereof.

In some embodiments the feedback variable is an amplitude measure of an observed ECAP (V), and the estimate of patient posture comprises a ratio of an equivalent ECAP amplitude in a reference posture to the amplitude measure (ratio $\hat{V}/V$), or any suitable function thereof. In some embodiments, the stimulus parameter is a stimulus current I, and an estimated recruitment $\hat{V}$ is determined by solving $C=I^k V=(\hat{V}/M_0+T_0)^k\hat{V}$.

In some embodiments a first histogram is compiled from values of the stimulus parameter over time. In such embodiments the estimate of patient posture may comprise or be derived from a position of a peak in the histogram. In some embodiments a second histogram is compiled from values of the feedback variable over time. In such embodiments the estimate of patient posture may comprise or be derived from a position of a peak in the second histogram.

In some embodiments a two-dimensional histogram is compiled from data pairs, each data pair comprising a stimulus parameter and a respective feedback variable. In such embodiments the estimate of patient posture may comprise or be derived from a position of a peak in the two-dimensional histogram.

Additionally or alternatively, in such embodiments the estimate of patient posture may comprise or be derived from a correlation of observed univariate or multivariate histogram data to pre-identified posture signature histograms. Additionally, or alternatively, the estimate of patient posture may be derived by associating a sub-area of the univariate or multivariate histogram with a posture, and determining the patient is in that posture when the data clusters in the sub-area.

In some embodiments the estimate of patient posture may be used to control the at least one stimulus parameter.

In some embodiments the estimate of patient posture can be used to determine how much variation in recruitment the patient will experience across postures if constant-voltage feedback is used. In such embodiments, an indication of high variation in recruitment may be used to trigger activation of I-V feedback loop control.

In some embodiments the estimate of patient posture may be used as a relative measure of nerve-electrode distance. For example, a relative measure of nerve-electrode distance may be calculated as an inverse function of posture.

According to a fifth aspect the present invention provides an implantable device for controllably applying a neural stimulus, the device comprising:
  a plurality of electrodes including one or more nominal stimulus electrodes and one or more nominal sense electrodes;
  a stimulus source for providing a stimulus to be delivered from the one or more stimulus electrodes to a neural pathway in order to give rise to an evoked action potential on the neural pathway;
  measurement circuitry for recording a neural compound action potential signal sensed at the one or more sense electrodes; and
  a control unit configured to:
    control application of a neural stimulus as defined by a stimulus parameter;
    measure via the measurement circuitry a neural compound action potential response evoked by the stimulus;
    determine from the measured evoked response a feedback variable;
    implement a feedback controller which completes a feedback loop, the feedback controller using the feedback variable to control the stimulus parameter; and
    the control unit further configured to compile a multidimensional dataset comprising a plurality of data variable values, each data variable value being associated with a respective neural stimulus and associated measured evoked response, the multidimensional dataset comprising at least one of the stimulus parameter and the feedback variable; and
    the control unit further configured to store a plurality of multidimensional datasets over time in respect of a plurality of neural stimuli and respective associated measured evoked responses, by updating a multidimensional histogram to reflect each multidimensional dataset after it is obtained, and storing the multidimensional histogram in a storage unit of the device.

According to a sixth aspect the present invention provides an automated method of controlling a neural stimulus, the method comprising:
  applying the neural stimulus to a neural pathway in order to give rise to an evoked action potential on the neural pathway, the stimulus being defined by a stimulus parameter;
  measuring a neural compound action potential response evoked by the stimulus, and deriving from the measured evoked response a feedback variable;
  completing a feedback loop by using the feedback variable to control the stimulus parameter;
  compiling a multidimensional dataset comprising a plurality of data variable values, each data variable value being associated with a respective neural stimulus and associated measured evoked response, the multidimensional dataset comprising at least one of the stimulus parameter and the feedback variable; and
  storing a plurality of multidimensional datasets over time in respect of a plurality of neural stimuli and respective associated measured evoked responses, by updating a multidimensional histogram to reflect each multidimensional dataset as it is obtained.

In embodiments of the fifth and sixth aspects, the multidimensional histogram may comprise a two dimensional histogram. For example, the dataset may comprise two data variable values, comprising the stimulus parameter and the feedback variable. The multidimensional histogram may comprise a three dimensional histogram, or more than three dimensions.

In some embodiments the stimulus parameter may comprise a stimulus current amplitude. In some embodiments the feedback variable may comprise an observed ECAP amplitude, or a variable derived therefrom. In some embodiments the feedback variable may be derived from both the observed ECAP amplitude and the respective stimulus parameter.

In some embodiments, the multidimensional histogram may be processed in order to determine a posture.

In some embodiments, a two-dimensional histogram of current-voltage data may be converted to a two-dimensional posture-recruitment histogram by applying a bin warping function. The two-dimensional posture-recruitment histogram may be used to obtain a one-dimensional posture histogram and/or a one-dimensional recruitment histogram.

In some embodiments, the multidimensional histogram may be processed in order to determine a posture by performing clustering analysis, intensity analysis, and/or topographic analysis of the histogram and/or warped histogram.

In some embodiments, posture is determined repeatedly over time.

According to a seventh aspect the present invention provides an implantable device for controllably applying a neural stimulus, the device comprising:
  a plurality of electrodes including one or more stimulus electrodes and one or more sense electrodes;
  a stimulus source for providing a stimulus to be delivered from the one or more stimulus electrodes to a neural pathway in order to give rise to an evoked action potential on the neural pathway;

measurement circuitry for recording a neural compound action potential signal sensed at the one or more sense electrodes; and a control unit configured to:
control application of a neural stimulus as defined by at least one stimulus parameter;
measure via the measurement circuitry a neural compound action potential response evoked by the stimulus;
determine from the measured evoked response a feedback variable;
implement a feedback controller which completes a feedback loop, the feedback controller using the feedback variable to control the at least one stimulus parameter; and
the control unit further configured to estimate a patient posture from at least one of the feedback variable and the stimulus parameter.

According to an eighth aspect the present invention provides an automated method of controlling a neural stimulus, the method comprising:
applying the neural stimulus to a neural pathway in order to give rise to an evoked action potential on the neural pathway, the stimulus being defined by at least one stimulus parameter;
measuring a neural compound action potential response evoked by the stimulus, and deriving from the measured evoked response a feedback variable;
completing a feedback loop by using the feedback variable to control the at least one stimulus parameter; and
estimating a patient posture from at least one of the feedback variable and the stimulus parameter.

In some embodiments of the seventh and eighth aspects the feedback controller completes the feedback loop by using the feedback variable to control the at least one stimulus parameter so as to maintain the feedback variable at a constant level. In some embodiments of the seventh and eighth aspects the feedback controller completes the feedback loop by using the feedback variable to control the at least one stimulus parameter so as to maintain neural recruitment at a constant level.

According to a further aspect the present invention provides a non-transitory computer readable medium for controllably applying a neural stimulus, comprising instructions which when executed by one or more processors carry out the method of the second, fourth, sixth or eighth aspect of the invention.

The feedback variable could in some embodiments be any one of: an amplitude; an energy; a power; an integral; a signal strength; or a derivative, of any one of: the whole evoked compound action potential; the fast neural response for example in the measurement window 0-2 ms after stimulus; the slow neural response for example in the measurement window 2-6 ms after stimulus; or of a filtered version of the response. The feedback variable could in some embodiments be an average of any such characteristic determined over multiple stimulus/measurement cycles. The feedback variable may in some embodiments be the zero intercept, or the slope, of a linear portion of the response of ECAP amplitude to varying stimulus current. In some embodiments the feedback variable may be derived from more than one of the preceding characteristics.

The control variable, or stimulus parameter, could in some embodiments be one or more of the total stimulus charge, stimulus current, pulse amplitude, phase duration, interphase gap duration or pulse shape, or a combination of these.

The neural recordings may in some embodiments be obtained in accordance with the teachings of the present Applicant for example in U.S. Pat. No. 9,386,934, International Patent Publication No. WO 2020/082118, International Patent Publication No. WO 2020/082126, and/or International Patent Publication No. WO 2020/124135, the content of each being incorporated herein by reference.

The feedback variable may be determined from the measured neural response by assessing the measured neural response to ascertain an amplitude of a second peak (e.g. an N1 peak) and/or an amplitude of a third peak (e.g. a P2 peak), for example by identifying an N1-P2 peak-to-peak amplitude, to produce the feedback variable.

In some embodiments of the invention, the measurement circuitry is configured to record the recordings of the neural responses substantially continuously during device operation. For example, in some embodiments of the invention the implanted neuromodulation device is configured to record the recordings of the neural responses for a period of at least 8 hours of device operation. In some embodiments of the invention the implanted neuromodulation device is configured to record the recordings of the neural responses for a period of at least 2 days of device operation. In some embodiments of the invention the implanted neuromodulation device is configured to record the recordings of the neural responses for a period of at least 5 days of device operation. To this end, preferred embodiments of the invention provide for the implanted neuromodulation device to be configured to process each recording of a neural response in substantially real time in order to obtain a respective measure of neural activation, and further provide for the implanted neuromodulation device to store in memory only the measure of neural activation and not the entire recording. For example, the implanted neuromodulation device may store in memory a histogram of the plurality of measures of neural activation in the form of a plurality of bins, with a counter associated with a respective bin being incremented each time an additional measure of neural activation is obtained. Such embodiments permit such data to be obtained over a period of hours or days at a high rate, such as at 50 Hz or more, and to be stored in very compact manner by use of a histogram and to thereby avoid exceeding the limited memory constraints of an implantable device. The bins may each be allocated a width, or range, which is equal for each bin. Alternatively, the bins may be allocated respective widths which increase with increasing levels of neural activation, such as linearly increasing bin widths or exponentially increasing bin widths.

References herein to estimation, determination, comparison and the like are to be understood as referring to an automated process carried out on data by a processor operating to execute a predefined procedure suitable to effect the described estimation, determination and/or comparison step(s). The approaches presented herein may be implemented in hardware (e.g., using digital signal processors, application specific integrated circuits (ASICS) or field programmable gate arrays (FPGAs)), or in software (e.g., using instructions tangibly stored on computer-readable media for causing a data processing system to perform the steps described herein), or in a combination of hardware and software. The invention can also be embodied as computer-readable code on a computer-readable medium. The computer-readable medium can include any data storage device that can store data which can thereafter be read by a computer system. Examples of the computer readable medium include read-only memory ("ROM"), random-access memory ("RAM"), magnetic tape, optical data storage device, flash storage devices, or any other suitable storage devices. The computer-readable medium can also be distributed over network coupled computer systems so that the computer readable code is stored and/or executed in a distributed fashion.

In particular, it is to be understood that compiling, analysing or otherwise processing a "histogram" as defined herein is to be understood as including data representing a histogram, whether or not a diagrammatic representation of such data is ever produced.

BRIEF DESCRIPTION OF THE DRAWINGS

An example of the invention will now be described with reference to the accompanying drawings, in which:

FIG. 18a shows the posture/recruitment histogram data of FIG. 17, at full resolution; FIG. 18b is a one-dimensional histogram of posture extracted from the data of FIG. 18a; and FIG. 18c is a one-dimensional histogram of recruitment extracted from the data of FIG. 18a;

FIG. 20a is a two-dimensional histogram of the current vs. voltage data of FIG. 19 when warped into axes of posture vs. recruitment; FIG. 20b is a one-dimensional histogram of posture extracted from the data of FIG. 20a; and FIG. 20c is a one-dimensional histogram of recruitment extracted from the data of FIG. 20a;

DESCRIPTION OF THE PREFERRED EMBODIMENTS

Figure 1:
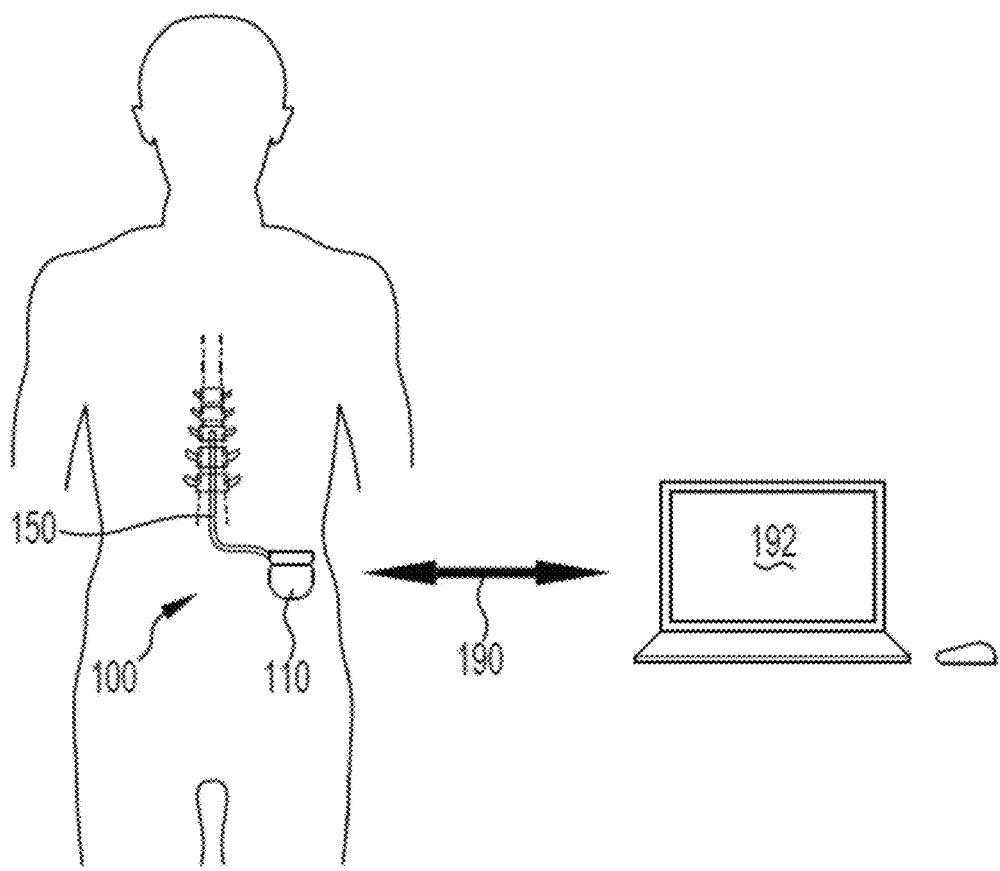
FIG. 1 schematically illustrates an implanted spinal cord stimulator.

FIG. 1 schematically illustrates an implanted spinal cord stimulator 100. Stimulator 100 comprises an electronics module 110 implanted at a suitable location in the patient's lower abdominal area or posterior superior gluteal region, and an electrode assembly 150 implanted within the epidural space and connected to the module 110 by a suitable lead. Numerous aspects of operation of implanted neural device 100 are reconfigurable by an external control device 192, which may be a clinician programmer and/or a patient programmer. Moreover, implanted neural device 100 serves a data gathering role, with gathered data being communicated to external device 192 via any suitable transcutaneous communications channel 190. Communications channel 190 may be effected by radio frequency (RF) communication, proximal inductive interaction or the like. Communications channel 190 may be active on a substantially continuous basis, at periodic intervals, at non-periodic intervals, or upon request from the external device 192.

Figure 2:
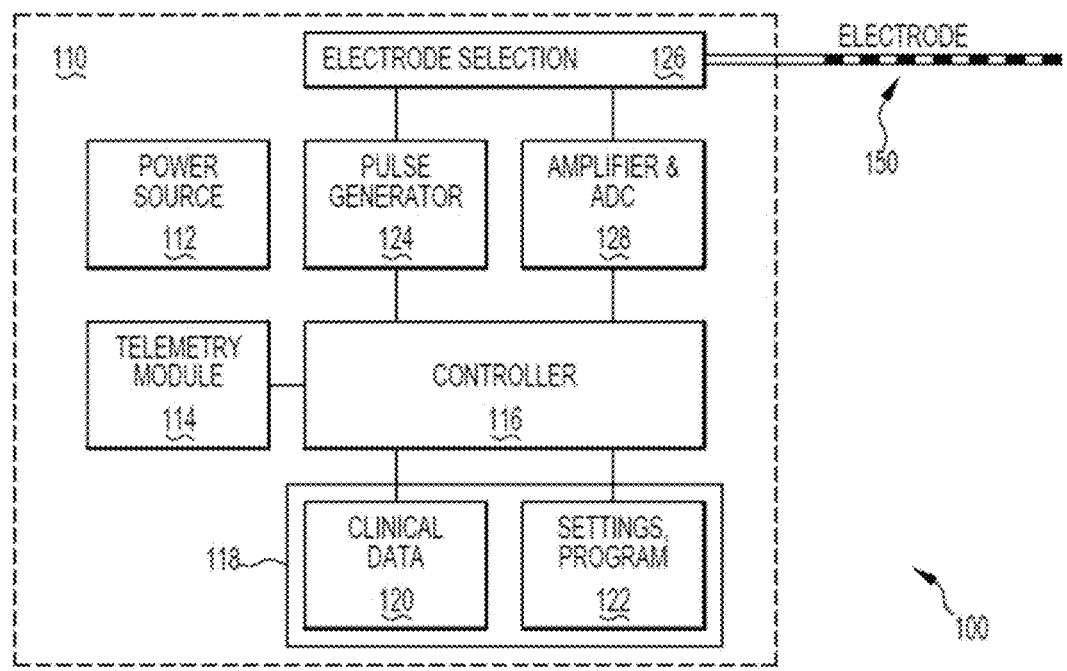
FIG. 2 is a block diagram of the implanted neurostimulator.

FIG. 2 is a block diagram of the implanted neurostimulator 100. Module 110 contains a battery 112 and a telemetry module 114. In embodiments of the present invention, any suitable type of transcutaneous communication 190, such as infrared (IR), electromagnetic, capacitive and inductive transfer, may be used by telemetry module 114 to transfer power and/or data between an external device 192 and the electronics module 110. Module controller 116 has an associated memory 118 storing patient settings 120, control programs 122 and the like. Controller 116 controls a pulse generator 124 to generate stimuli in the form of current pulses in accordance with the patient settings 120 and control programs 122. Electrode selection module 126 switches the generated pulses to the appropriate electrode(s) of electrode array 150, for delivery of the current pulse to the tissue surrounding the selected electrode(s). The electrode array 150 may comprise one or more electrodes such as electrode pads on a paddle lead, circular (e.g., ring) electrodes surrounding the body of the lead, conformable electrodes, cuff electrodes, segmented electrodes, or any other type of electrodes capable of forming unipolar, bipolar or multipolar electrode configurations for therapy. The electrodes may pierce or affix directly to the tissue itself.

Measurement circuitry 128 is configured to capture measurements of neural responses sensed at sense electrode(s) of the electrode array as selected by electrode selection module 126.

Figure 3:
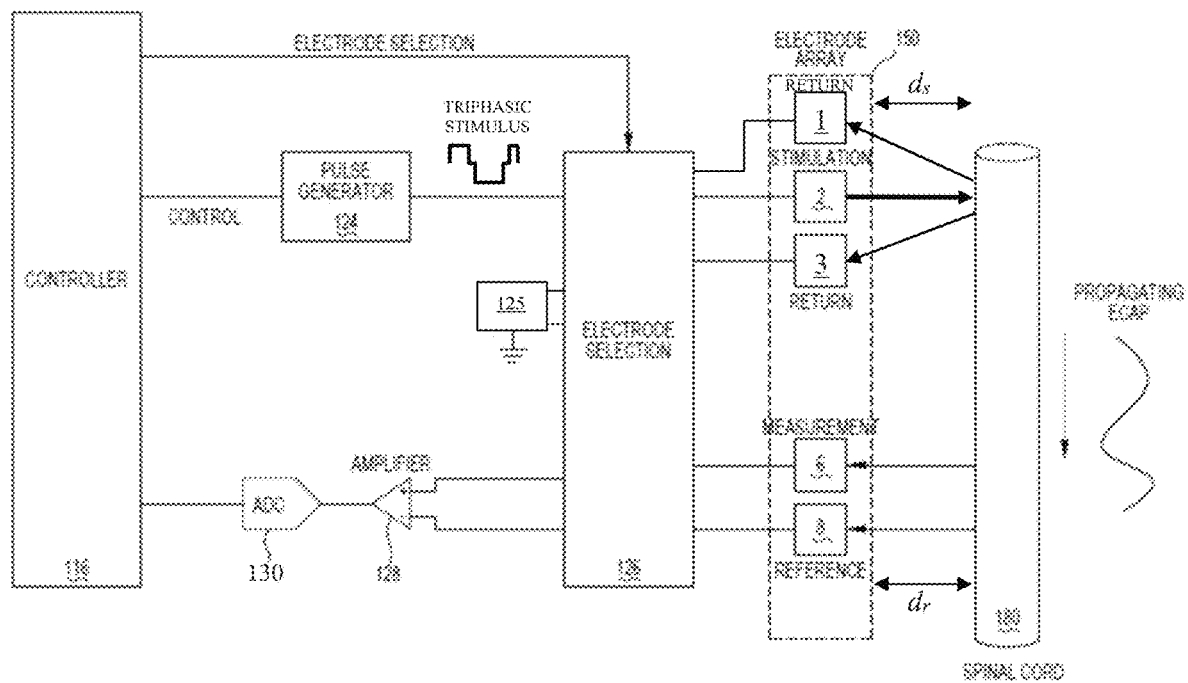
FIG. 3 is a schematic illustrating interaction of the implanted stimulator with a nerve.

FIG. 3 is a schematic illustrating interaction of the implanted stimulator 100 with a nerve 180, in this case the spinal cord however alternative embodiments may be positioned adjacent any desired neural tissue including a peripheral nerve, visceral nerve, parasympathetic nerve or a brain structure. Electrode selection module 126 selects a stimulation electrode 2 of electrode array 150 to deliver an electrical current pulse, which in this embodiment comprises three phases, i.e. a triphasic stimulus. The triphasic stimulus may be configured so as to reduce the effect of stimulus artefact upon ECAP measurements, in accordance with the teachings of WO 2017/219096, the contents of which are incorporated herein by reference. The electrode selection module 126 selects a stimulus electrode 2 to deliver the triphasic pulse to surrounding tissue including nerve 180, and also selects two return electrodes 1 and 3 of the array 150 for stimulus current recovery in each phase, to maintain a zero net charge transfer. The use of three electrodes in this manner for delivering and recovering current in each stimulus phase is referred to as tripolar stimulation. Stimulus current recovery is controlled by current return module 125. The tripolar stimulus may in some embodiments be configured in order to elicit a spatially constrained ECAP in accordance with the teachings of International Patent Publication No. WO 2020/082118, the contents of which are incorporated herein by reference. Additionally, or alternatively, the tripolar stimulus may be configured in order to minimise stimulus artefact so as to ease ECAP measurement in accordance with the teachings of International Patent Publication No. WO 2020/082126, the contents of which are incorporated herein by reference. Alternative embodiments may apply other forms of tripolar stimulation, or may use a greater or fewer number of stimulus electrodes.

Delivery of an appropriate stimulus from electrodes 1, 2, 3 to the nerve 180 evokes a neural response comprising an evoked compound action potential which will propagate along the nerve 180 as illustrated, for therapeutic purposes which in the case of a spinal cord stimulator for chronic pain might be to create paraesthesia at a desired location. To this end the stimulus electrodes are used to deliver stimuli at any therapeutically suitable frequency, for example 30 Hz, although other frequencies may be used including as high as the kHz range, and/or stimuli may be delivered in a non-periodic manner such as in bursts, or sporadically, as appropriate for the patient. To fit the device, a clinician applies stimuli of various configurations which seek to produce a sensation that is experienced by the user as a paraesthesia. When a stimulus configuration is found which evokes paraesthesia, which is in a location and of a size which is congruent with the area of the user's body affected by pain, the clinician nominates that configuration for ongoing use.

The device 100 is further configured to sense the existence and intensity of compound action potentials (CAPs) propagating along nerve 180, whether such CAPs are evoked by the stimulus from electrodes 1, 2 and 3, or otherwise evoked. To this end, any electrodes of the array 150 may be selected by the electrode selection module 126 to serve as measurement electrode 6 and measurement reference electrode 8, whereby the electrode selection module 126 selectively connects the chosen electrodes to the inputs of the amplifier 128. Thus, signals sensed by the measurement electrodes 6 and 8 are passed to the measurement circuitry comprising amplifier 128 and analog-to-digital converter (ADC) 130. The measurement circuitry for example may operate in accordance with the teachings of International Patent Publication No. WO 2012/155183 by the present applicant, the content of which is incorporated herein by reference.

Neural recordings obtained from the measurement electrodes 6, 8 via measurement circuitry 128, 130 are processed by controller 116 to obtain information regarding the effect of the applied stimulus upon the nerve 180. Stimulator 100 applies stimuli over a potentially long period such as days, weeks or months and during this time records neural responses, stimulation settings, paraesthesia target level, and other operational parameters. The stimulator 100 operates on a closed loop basis, in that the recorded neural responses are used in a feedback arrangement to control stimulation settings of future stimuli on a continuous or ongoing basis. To effect suitable SCS therapy stimulator 100 may deliver tens, hundreds or even thousands of stimuli per second, for many hours each day. The feedback loop may operate for most or all of this time, by obtaining neural response recordings following every stimulus, or at least obtaining such recordings regularly. Each recording generates a feedback variable such as a measure of the amplitude of the evoked neural response, which in turn results in the feedback loop changing the stimulation parameters for a following or later stimulus. Stimulator 100 thus may produce such data at a rate of tens or hundreds of Hz, or even kHz, and over the course of hours or days this process results in large amounts of clinical data which may be stored in the clinical data store 120 of memory 118. This is unlike past neuromodulation devices such as SCS devices which lack any ability to record any neural response. Memory 118 is however necessarily of limited capacity and care is thus required to select compact data forms for storage into the memory 118, to ensure that the memory is not exhausted before such time that the data is expected to be retrieved wirelessly by device 192, which may occur only once or twice a day, or less.

Accordingly, in the present embodiment the neural recordings produced by the measurement circuitry 128, 130 are processed by controller 116 in a manner which retrieves a single data point from each recording, comprising an ECAP peak-to-peak amplitude in µV. For example, the neural recordings may be processed to determine the ECAP peak-to-peak amplitude in accordance with the teachings of International Patent Publication No. WO 2015/074121, the contents of which are incorporated herein by reference. Alternative embodiments may select an alternative single data point to retrieve from the recording to be stored, or may retrieve and store 2 or more data points from the recording.

Figure 4:
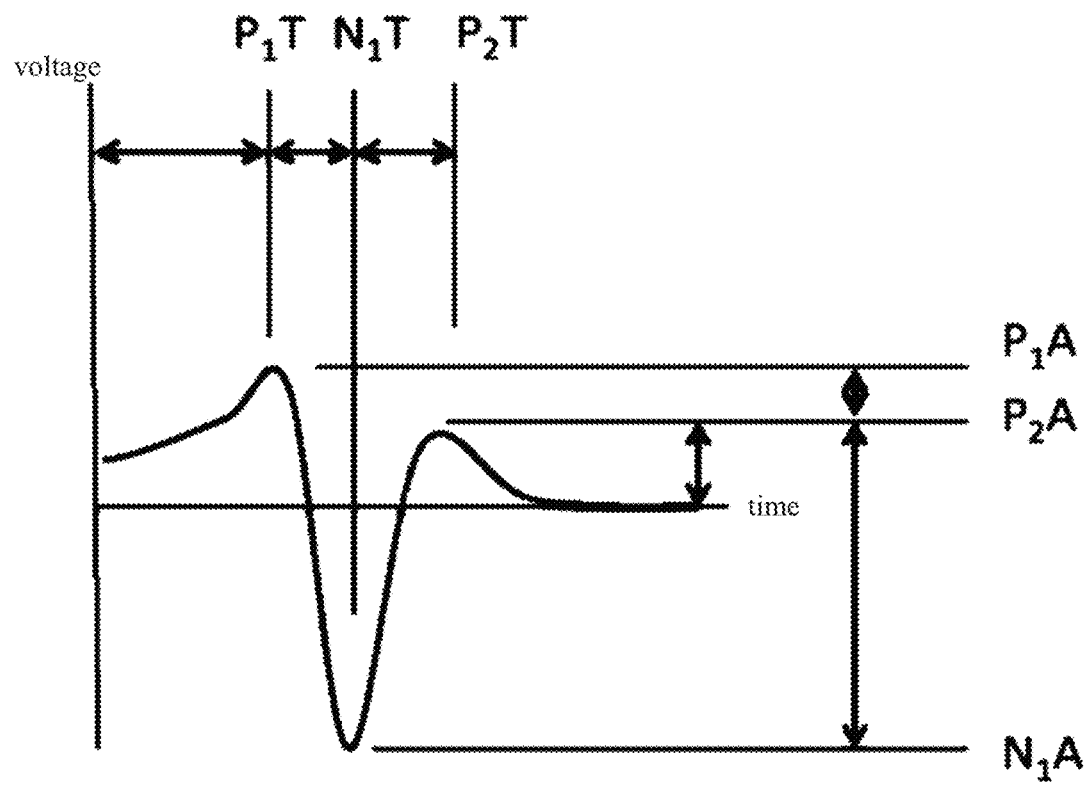
FIG. 4 illustrates the typical form of an electrically evoked compound action potential.

FIG. 4 illustrates the typical form of an electrically evoked compound action potential of a healthy subject. The shape of the compound action potential shown in FIG. 4 is somewhat predictable because it is a result of the ion currents produced by the ensemble of axons generating action potentials in response to stimulation. The action potentials generated among a large number of fibres sum to form a compound action potential (CAP). The CAP is the sum of responses from a large number of single fibre action potentials. The CAP recorded is the result of a large number of different fibres depolarising. The propagation velocity is determined largely by the fibre diameter. The CAP generated from the firing of a group of similar fibres is measured as a positive peak potential $P_1$, then a negative peak $N_1$, followed by a second positive peak $P_2$. This is caused by the region of activation passing the recording electrodes 6, 8 as the action potentials propagate along the individual fibres.

The CAP profile thus takes a typical form and can be characterised by any suitable parameter(s) of which some are indicated in FIG. 4. Depending on the polarity with which the recording electrodes 6, 8 are connected to amplifier 128, a normal recorded profile may take an inverse form to that shown in FIG. 4, i.e. having two negative peaks $N_1$ and $N_2$, and one positive peak $P_1$.

As noted in the preceding, movement of the patient can cause the positions, shapes and alignments of the electrode array 150 and the nerve 180 to change considerably relative to each other and relative to the surrounding anatomy. In particular, as shown in FIG. 3, a distance $d_s$ of the stimulus electrode 2 from the nerve 180 can vary, as can a distance $d_r$ of the recording electrodes from the nerve 180. Due to flexibility of array 150 and nerve 180, and possible changes in the alignment and position of each, $d_s$ is not always equal to $d_r$, and changes in $d_s$ are not always equal to changes in $d_r$.

Figure 5:
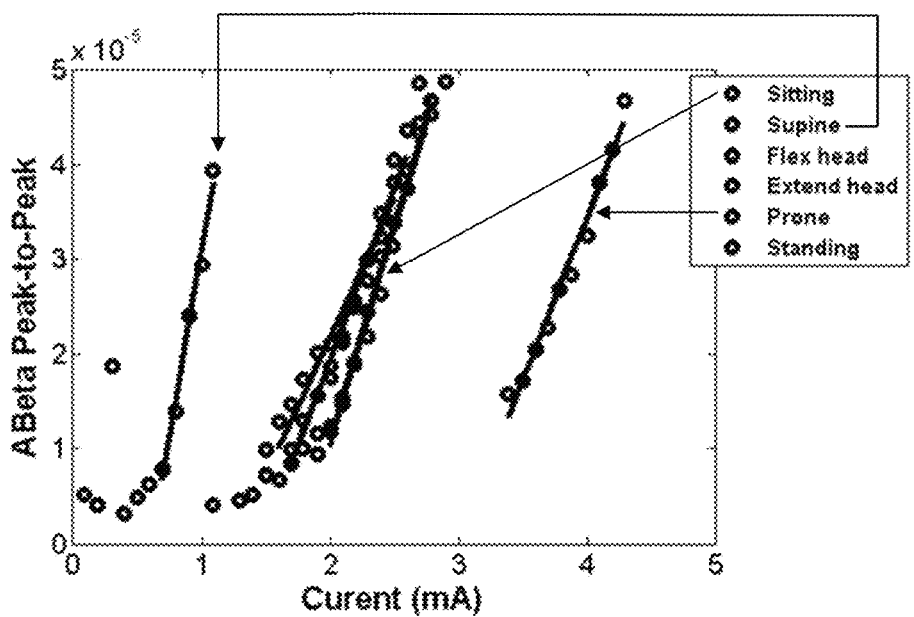
FIG. 5 illustrates a range of growth curves which may arise in a single patient, one for each posture.

At therapeutic levels, an observed CAP signal will typically have a maximum amplitude in the range of tens of microvolts. With increasing stimulus current I, the ECAP amplitude V typically follows a growth curve. FIG. 5 illustrates a range of growth curves which may arise in a single patient, one for each posture. A typical growth curve is characterised by a first portion below a threshold, in which a non-zero stimulus current elicits no ECAP, and a second portion above the threshold in which further increases in stimulus current above the threshold give rise to linearly increasing ECAP amplitude. The threshold T, and the slope M of the second portion of the growth curve, both depend on the electrode-to-fibre distance and thus both vary with posture. For example, as can be seen in FIG. 5, a supine posture has a lower threshold and a larger slope, as compared to a prone posture.

The present embodiment thus utilises a model of ECAP generation which accounts for situations where the electrodes move relative to the target tissue, as described in International Patent Publication No. WO 2017/173493, the contents of which are incorporated herein by reference. We revisit in the following some key elements of the model of ECAP generation, using slightly revised mathematical terminology.

The model of ECAP generation expresses a patient's transfer function from stimulus current, I, to ECAP amplitude, V. (In other implementations, V may stand for a characteristic of the ECAP other than amplitude provided that characteristic follows the modelling equations given below.) This transfer function depends on the electrode-to-fibre distance, p, assuming $d_s=d_r=p$, which itself depends on the patient's posture. The model depends only on the relative value of p, so we need to pick a reference point. We choose to set p=1 in the patient's reference posture. This could be any posture, preferably one the patient can easily repeat.

We use a piecewise linear model, where the ECAP increases linearly above threshold. The threshold T and slope M both vary with p:

$$V = \begin{cases} 0 & I < T(p) \\ M(p)(I - T(p)) & I \geq T(p) \end{cases}$$

T and M are dependent on the stimulus and recording transfer functions, which are assumed to be power laws. Let $T_0$ and $M_0$ be the threshold and slope, respectively, in the reference posture, ie.

$$T(1)=T_0$$

$$M(1)=M_0$$

For a suprathreshold current, the recruitment R effected by application of a stimulus falls off with the distance $d_s$, with some power m:

$$R \propto (I-T(p))p^{-m}$$

This is the stimulation transfer function.

Recording falls off with the distance $d_r$, with another power n:

$$V \propto R p^{-n}$$

This is the recording transfer function.

From the above we get:

$$V = M_0 p^{-(m+n)}(I-T_0 p^m)$$

This is the patient's transfer function.

Thus we obtain the model functions:

$$T(p)=T_0 p^m$$

$$M(p)=M_0 p^{-(m+n)}$$

To effect a feedback loop which allows for both the stimulation transfer function as well as the recording transfer function in such a manner is referred to herein as I-V control. To implement I-V control we wish to maintain a constant recruitment, R, regardless of p. At constant recruitment:

$$I \propto p^m$$

$$V \propto p^{-n}$$

Constant recruitment here means stimulating at a constant multiple of the applicable threshold T(p). We can derive a feedback variable, C, so that the powers of p cancel:

$$C = I^n V^m$$

This has the property that:

$$\frac{dC}{dp} = 0$$

and so we can use C as a distance-independent measure of recruitment.

It is further to be noted that it is not necessary to know either m or n; we need only know their ratio, k, to derive a slightly different feedback variable:

$$k = \frac{n}{m}$$

$$C = I^k V$$

Figure 6:
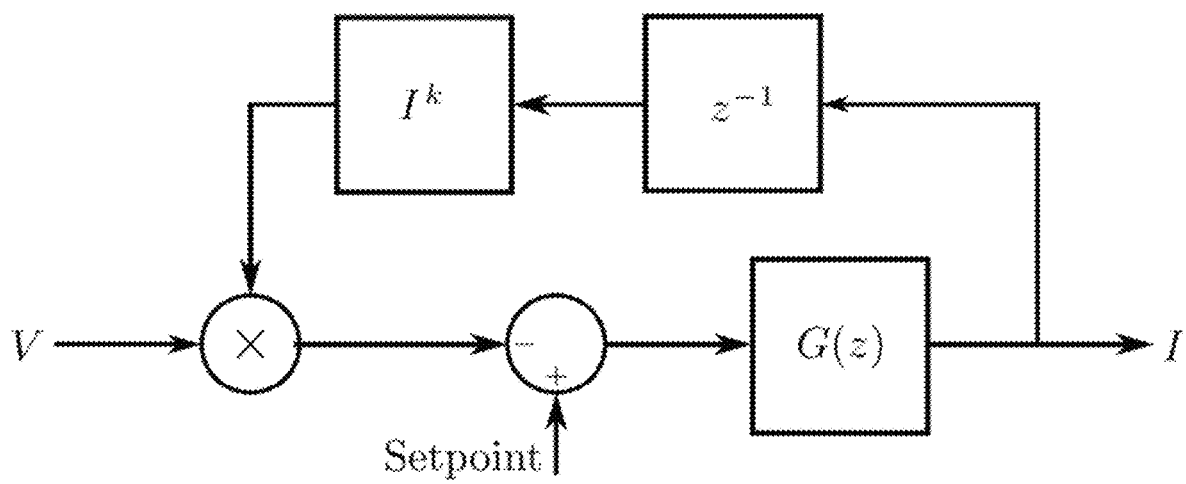
FIG. 6 illustrates application of a model of ECAP generation in a feedback loop, according to one implementation of I-V control of neurostimulation.

FIG. 6 illustrates application of such a model in a feedback loop, according to an original implementation of I-V control of neurostimulation.

This choice of C results in a control transfer function that curves upwards with increasing current, which is to say, $$\frac{d^2 C}{dI^2} > 0$$

which has beneficial implications for stability with an integrating controller. This positive curvature means that the controller no longer has constant gain: when the setpoint is higher, the slope will be higher also. This can be compensated in the implementation by adjusting the control gain when the setpoint changes, as described in Australian provisional patent application no. AU2020903083 by the present applicant, which is incorporated herein by reference.

The value $I^k V$, or any monotonic function thereof, is a measure of the neural recruitment. This measure is not necessarily linear with the underlying recruitment, but it is monotonic.

The value of m will depend on the stimulation configuration; n will depend on the recording configuration. Both will also depend on lead placement and the patient's neural parameters. The value of k needs to be fitted to each patient configuration individually.

Accordingly a fitting process is required. In this respect it is noted that the transfer parameter k can be determined without knowing p. Assuming that the patient's comfort level corresponds to a constant neural recruitment, one option is to use the patient's comfort level as a reference point. Under this approach, the current and voltage occurring at the patient's comfort level are measured in each of a plurality of postures. Let the comfort levels in the $i^{th}$ posture be denoted $V_i$ and $I_i$. Given that $$I_i \propto p_i^m$$

$$V_i \propto p_i^{-n}$$

we can simply fit a line through points $(\log I_i, \log V_i)$, which will have slope $-k$, yielding k for that particular patient.

Another fitting method is to look at the thresholds and slopes in different postures:

$$T_i = T_0 p^m$$

$$M_i = M_0 p^{-m} p^{-n}$$

A line through $(\log T_i, \log M_i T_i)$ would also have slope $-k$, thus providing another method by which to obtain the transfer parameter k for that particular patient.

The transfer parameter k can also be manually adjusted to fine-tune a patient's perceived uniformity. If they perceive an increase in stimulation when moving to a more sensitive posture, such as from prone to supine, then k should be decreased, and vice versa.

The feedback variable, $I^k V$, is a proxy for recruitment; it varies monotonically with recruitment regardless of posture, but it is a non-linear relationship. The present embodiment recognises that there are tasks where a linear measure of recruitment would be more useful: for example, for the patient to set their target level (setpoint), and for the analysis of feedback histograms.

When posture is held constant, the ECAP amplitude V varies roughly linearly with recruitment R, as in SCS the spatial extent of recruitment increases with current while the characteristics of the recruited population remain fairly constant with current.

Using the model equations, we can project any measurement of $I^k V$ on to any posture: this tells us what ECAP amplitude would be expected in that posture, for the same recruitment. This lets us define a linear recruitment measure, namely the equivalent ECAP amplitude in the reference posture, referred to herein as the refcap. The refcap, $\hat{V}$, has units of voltage.

The refcap is a natural choice of feedback variable for closed-loop control. The refcap also yields a measure of posture, independent of recruitment: the ratio $\hat{V}/V$ depends on $p^n$ but not R.

The refcap can be converted to and from the feedback variable, C, of the original implementation of I-V control by solving the equation:

$$C = \left(\frac{\hat{V}}{M_0} + T_0\right)^k \hat{V} \quad (1)$$

This equation has no closed-form solution, so a numeric method must be used to obtain the refcap $\hat{V}$ from C. The refcap may then be used as a feedback variable in a "refcap implementation" of I-V control of neurostimulation.

In an alternative implementation of refcap-based I-V control, the original implementation of I-V control is used, as illustrated in FIG. 6. However, the patient's setpoint is treated as a value $\hat{V}$ of refcap, which is linear with recruitment. Equation (1) is then applied to convert the setpoint into a value of C, which is then compared with the computed feedback variable by the feedback controller. This implementation is less computationally intensive than an implementation in which the refcap is used as a feedback variable, since Equation (1) does not need to be solved for the refcap at every stimulus cycle. In addition, the setpoint controlled by the patient is linear with recruitment, as in the implementation in which the refcap is used as a feedback variable.

To calculate the refcap in an implant may be difficult as this requires heavy computation or lookup tables. On the other hand, the present disclosure recognises that it can be efficient to estimate the posture when using the original implementation of I-V control. I-V control acts to keep the recruitment, and hence the refcap, constant. Thus, the posture will vary with $V^{-1}$. Thus when using the original implementation of I-V control, $V^{-1}$ yields an alternative posture estimate signal.

The refcap can be calculated regardless of the control method in use; k, $M_0$ and $T_0$ can be estimated in any patient, and used to calculate refcaps in open loop or constant voltage control modes as well as I-V control modes.

Figure 7:
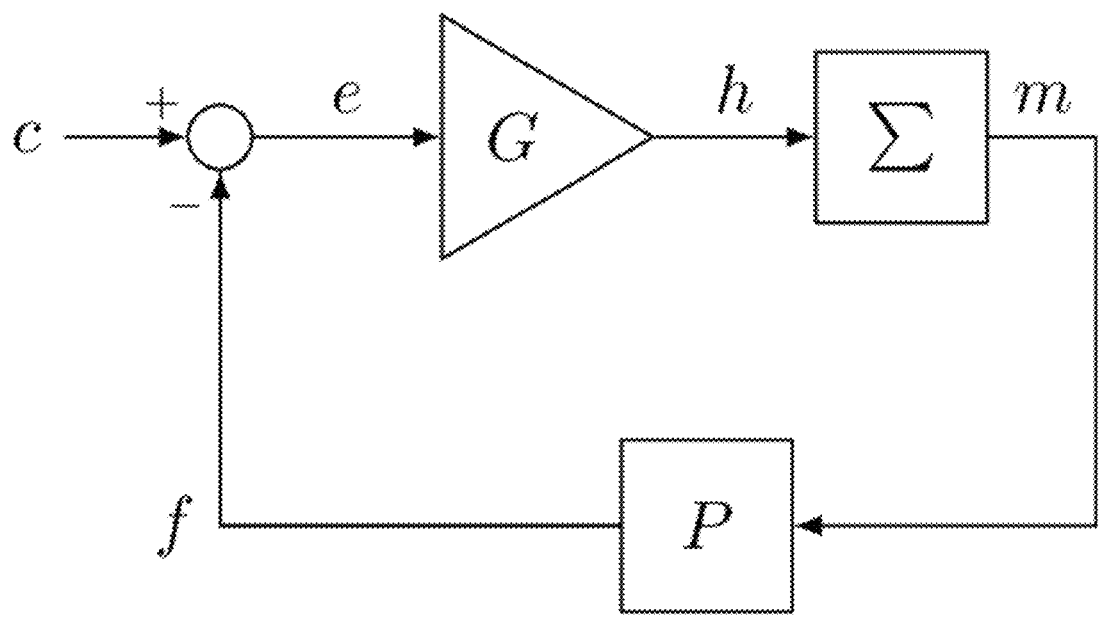
FIG. 7 illustrates a simplified model of an integrating control loop in one embodiment.

The present embodiments further provide for the integration of control of a nonlinear element in the feedback loop. An I-V feedback loop seeks to keep recruitment constant by adjusting the stimulus current. After each stimulus pulse, the ECAP is measured; the difference between the actual and desired feedback variable is the error. This error is multiplied by a control gain and then fed to an integrator. The integrator keeps a running sum of the errors to determine the next stimulus current. FIG. 7 illustrates a simplified model of the integrating control loop in this embodiment. The output of the integrator is the stimulus current m. The patient is modelled as converting a stimulus current m into a feedback variable f with some slope P. The difference between f and the patient's setpoint, c, is the error, e. The loop error, e, is multiplied by gain G and integrated for the next time step.

In effect, after each stimulus, the system takes a step towards the desired setpoint. For example, if the measured ECAP is larger than the setpoint, the error is negative, and the integrator decreases the current. In implementing such a loop it is important to understand the dynamic behaviour of the loop, such as how quickly it converges to the patient's setpoint, and under what circumstances might it become unstable and oscillate, and such behaviour is dictated by the step size. With a small step size, the loop converges smoothly towards the target. On the other hand, if the steps are too large, the loop will overshoot the setpoint. Dynamic loop behaviour and control are addressed in Australian provisional patent application no. AU2020903083 by the present Applicant.

Accordingly, the control gain G in the loop may be made adjustable, to allow adjustment of the loop to suit each particular patient.

Figure 8A:
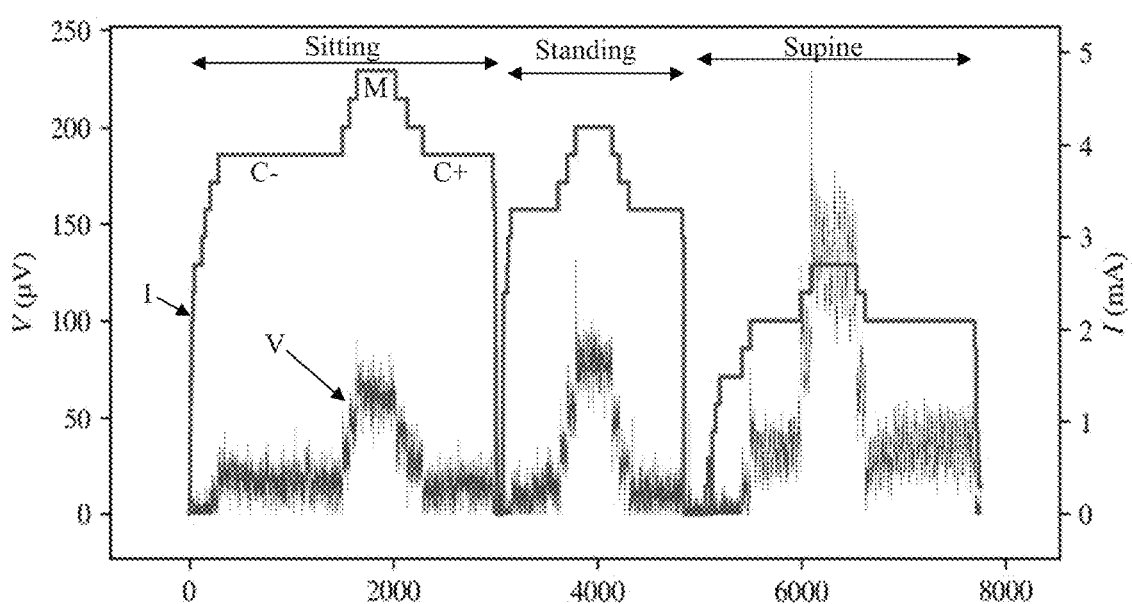
FIGS. 8a and 8b illustrate data obtained in a human posture change experiment.
Figure 8B:
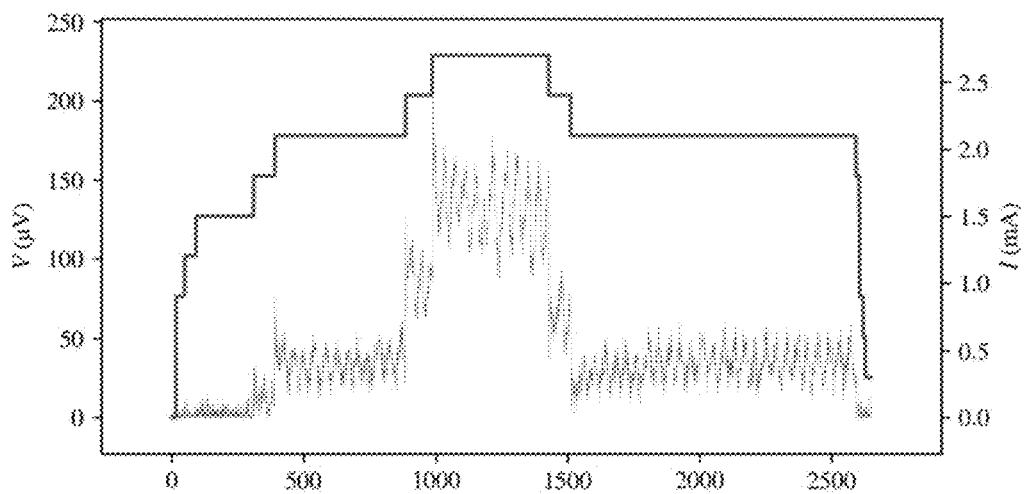

To demonstrate the estimation of recruitment R, a human posture change experiment was analysed. The obtained data is shown in FIGS. 8a and 8b, and consists of three current sweeps performed in a human patient denoted P0119. The patient was placed in sitting, standing, and supine postures over the course of 2-3 minutes. In each posture, stimuli were applied at 60 Hz and the stimulus current I (right axis) was ramped up through perceptual threshold (T−), comfort (C−), up to maximum (M), and back down to comfort (C+). These stimulus current levels are indicated in FIG. 8a for the sitting posture, and it is to be noted that for other postures the stimulus current levels at T−, C−, M and C+ are different to that shown for sitting. While the stimulus current was adjusted in each posture, ECAP amplitude measurements (V, left axis) were recorded. Sitting is clearly the least sensitive posture, with the highest currents and smallest ECAPs. Supine is the most sensitive posture, with maximum occurring at less than 3 mA as compared to over 4 mA for sitting and standing. FIG. 8b is an enlargement of the supine portion of the data of FIG. 8a, with x-axis data shifted to the origin. A modulating signal is evident in the supine posture at approximately 1.5 Hz, so this variation in ECAP amplitude is likely to be caused by the patient's heartbeat, for example by way of electrode-to-fibre distance variations caused by heartbeat vibration.

In order to apply the hereinbefore described recruitment estimation methods, it is necessary to estimate the transfer parameter k for the patient in question. It is also necessary to estimate the reference posture threshold $T_0$ and reference posture slope $M_0$. Accordingly, the present embodiment provides for a patient parameter fitting process to be applied, which can be incorporated into the normal clinical fitting process for such devices.

Figure 9:
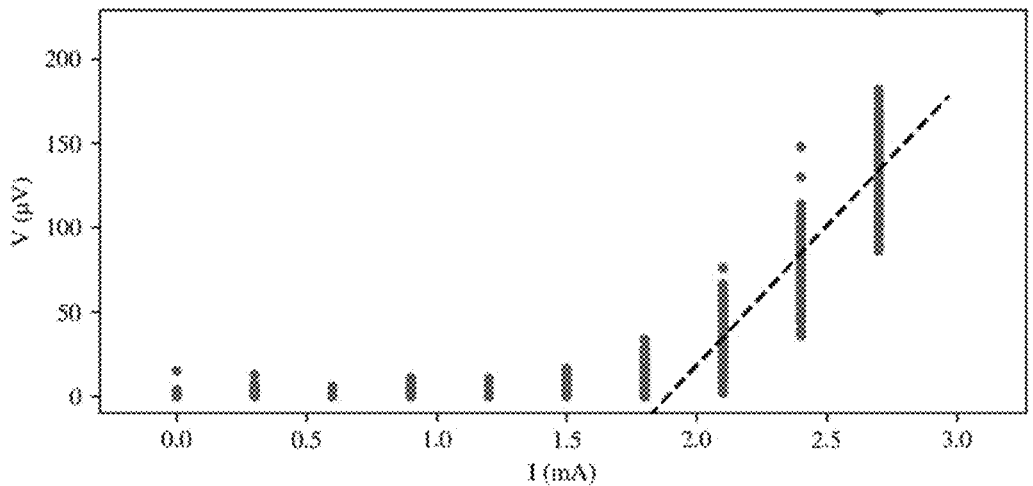
FIG. 9 illustrates a neural activation plot in the supine posture, with fitted line.

To achieve such fitting, the patient is asked to adopt the reference posture, which for example could be a supine posture because it is most sensitive, as shown in FIG. 8a. The current and voltage data obtained for that posture, shown in FIG. 8b, is processed so as to fit a line through those recorded I and V values which are above threshold. To avoid bias issues where the V values are clipped to zero, as is the case for the first 400 or so data points in FIG. 8b, this line is fitted by ignoring all currents at which any V=0 samples were recorded, and thus the line is fitted only to points which are far enough above threshold to be reliable. FIG. 9 illustrates fitting of such a line to the activation plot in the supine posture. The fitted line indicates that $T_0$=1.89 mA, and $M_0$=164 µV/mA, for this patient. It then remains necessary only to estimate the transfer parameter k for this patient.

One method for estimating k is to take a recruitment datum, e.g. comfort or maximum, so that equal recruitment can be achieved in each posture. After measuring the current and voltage Ii, Vi in each posture i at equal recruitment, a line can be fitted through the points (logIi, logVi). The slope of this line tells us k.

Figure 10:
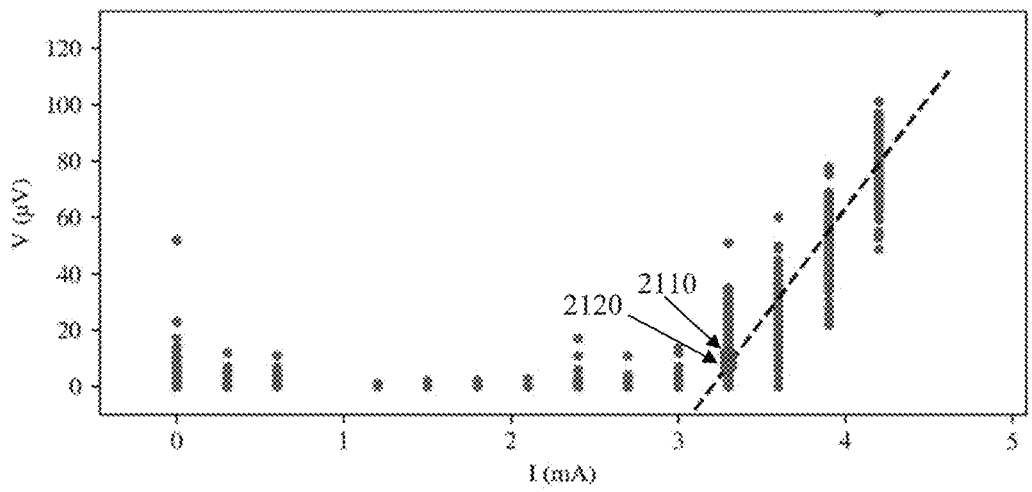
FIG. 10 illustrates a neural activation plot in the standing posture, with fitted line.

In this patient, it is challenging to measure the voltage and current at the comfort level in all postures: the current steps are coarse, leading to a corresponding uncertainty in both the current and voltage at "ideal" comfort, and the comfort ECAPs are quite small. This is highlighted by noting that the value of $T_0$ determined above indicates that the threshold is predicted to be in between the comfort level and the step below. This means that the quantisation error is significant. This is further illustrated with reference to FIG. 10, which illustrates fitting a line to the activation plot in the standing posture. Again, fitting of the line was performed only for currents where no recorded voltages were zero, avoiding clipping effects. However, the dot 2110 shows the average V at comfort current, whereas the dot 2120 shows the V which is estimated from the line at comfort current. The estimated V 2120 differs from the observed average V 2110 because in this posture, voltage clipping was occurring at comfort, again illustrating the difficulty of performing fitting when using the comfort level as the constant recruitment datum.

Figure 11:
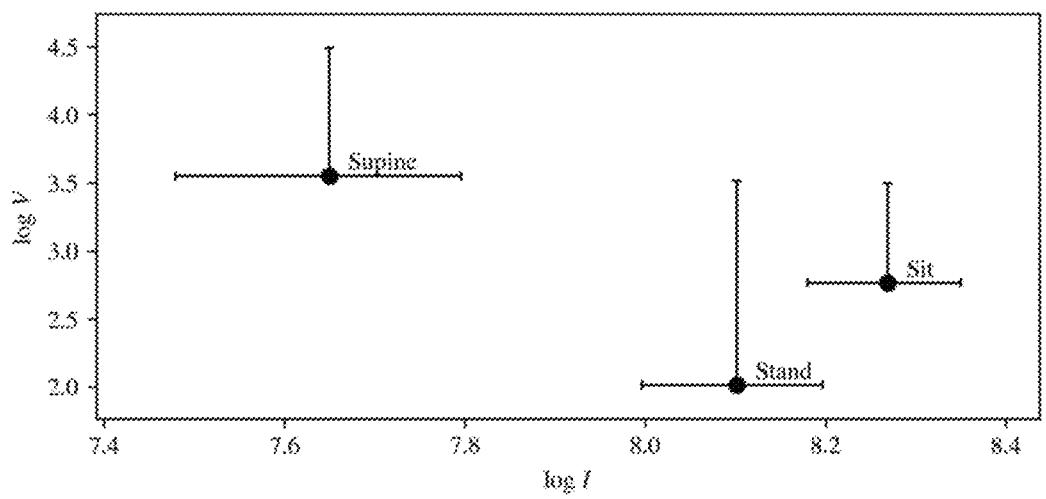
FIG. 11 is a plot of logI against logV for a subset of the data of FIG. 8a, when stimuli are applied at a comfort minus (C−) level in each posture.

This effect also makes it difficult to fit a line through the comfort points in the log domain. FIG. 11 illustrates logI plotted against logV at comfort minus (C−), at each of the three postures shown in FIG. 8a. In FIG. 11 error bars show the effect of one step up or down in current. Due to the above-noted problems with using the comfort level as the constant recruitment datum, the downward error is unlimited. Using the estimated thresholds and slopes from the previous fitting, combined with the current step size, we can determine quantisation error bars in the log domain for this fitting process. In this patient, the lower bound at comfort is V=0, as the quantisation error is so large. FIG. 11 thus illustrates that the line fitting may not be very accurate when using the comfort level as the constant recruitment datum. It is however to be noted that in other devices having a smaller current step size, and/or for other patients for whom the comfort level is more than one current step above threshold and/or for whom data at the comfort level is less noisy, it may be adequate to use the comfort level as the constant recruitment datum.

Figure 12:
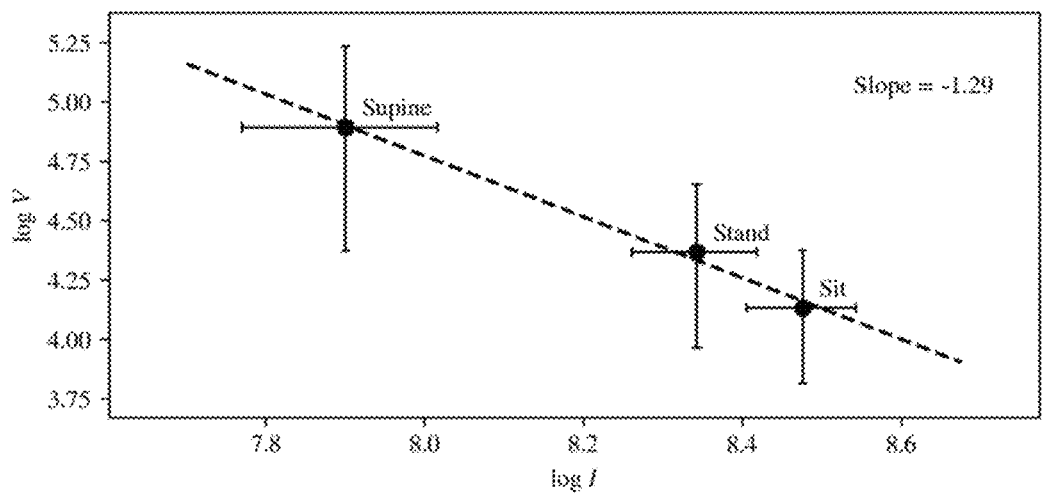
FIG. 12 is a plot of logI against logV for a subset of the data of FIG. 8a, when stimuli are applied at a maximum level in each posture.

However, the present embodiment notes that the comfort level is not the only constant recruitment datum which can be used, and that another possibility is to use the patient's maximum level as the constant recruitment datum. FIG. 12 illustrates the data of FIG. 8a, at the maximum level in each posture, when logI is plotted against logV. The quantisation error is reduced, because the current levels at the patient's maximum level are higher relative to the current step size. Additionally, as can be seen in FIGS. 8a and 8b, at the patient's maximum level the recorded ECAPs are further out of the noise, improving signal to noise ratio. From the line fitted to these points in FIG. 12, we find that the slope of logV vs. logI is −1.29, so we can estimate that for this patient k=1.29.

Figure 13:
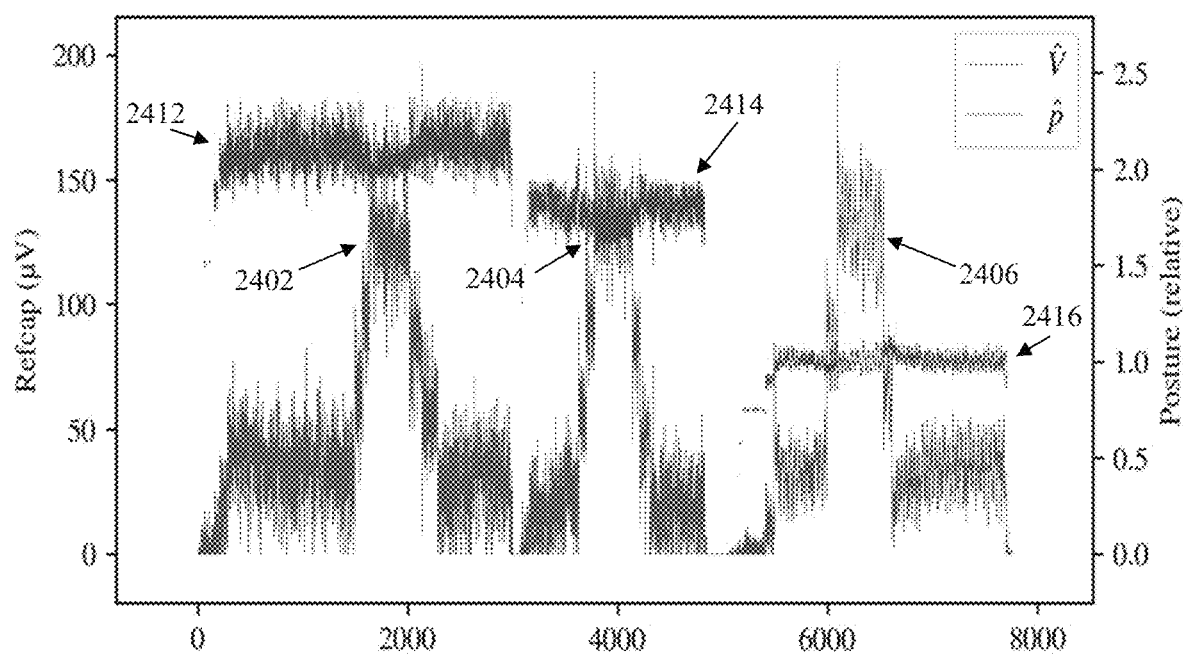
FIG. 13 illustrates the data of FIG. 8a when transformed into a recruitment-posture plane.

Once the device has been fitted as described above, the transfer parameter k, the reference posture threshold $T_0$ and the reference posture slope $M_0$ are known for the patient in question. Using these fitted parameter values, we can transform the recorded I and V values of FIG. 8a into estimated recruitment $\hat{V}$, by recalling the above-noted equations $$C=I^k V=(\hat{V}/M_0+T_0)^k \hat{V}$$

and into posture $\hat{p}$ by recalling that the ratio $\hat{V}/V$ depends on $p^n$ but not R. FIG. 13 illustrates the data of FIG. 8a after having been transformed into a recruitment-posture plane. The recruitment (left axis) is expressed as a refcap $\hat{V}$, ie. the ECAP that would be expected for this recruitment in the reference posture. The posture $\hat{p}$ (right axis) is unitless.

FIG. 13 reveals that this method for producing estimated recruitment $\hat{V}$ yields values for $\hat{V}$ which, for a given current perceptual level, are substantially the same irrespective of posture, as desired. For example in FIG. 13 it can be seen that during maximum current level stimulation the estimated recruitment $\hat{V}$ when the patient is sitting (2402) is substantially the same as the estimated recruitment $\hat{V}$ when the patient is standing (2404), and is substantially the same as the estimated recruitment $\hat{V}$ when the patient is supine (2406). The same can also be observed at the comfort level in each posture.

FIG. 13 further reveals that posture is unambiguously determined by $\hat{p}$. In particular, the values of $\hat{p}$ produced while the patient is sitting (2412) remain at a substantially constant value around 2.1 even at differing stimulus current levels. The values of $\hat{p}$ produced while the patient is standing (2414) remain at a substantially constant value around 1.8, even at differing stimulus current levels, and are clearly distinct from 2412. Further, the values of $\hat{p}$ produced while the patient is supine (2416) remain at a substantially constant value around 1.0 (as is expected noting that supine is the reference posture), and this is true even at differing stimulus current levels, and the values 2416 are clearly distinct from 2412 and 2414.

It is further noted that this method can be used to determine how much variation in recruitment the patient will experience across postures with constant-voltage feedback. As previously noted, the posture estimate is defined as:

$$\hat{p} = \frac{\hat{V}}{V}$$

Recruitment is proportional to the refcap, $\hat{V}$. Meanwhile, in constant-voltage feedback, V is kept constant by the control loop. Accordingly, if the patient changes from a posture with $\hat{p}=a$ to a new posture with $\hat{p}=b$, the recruitment must change by a factor b/a.

For example, if the human patient P0119 the subject of FIGS. 8-13 were configured for comfort in sitting position ($\hat{p}=2.2$), and then moved to supine ($\hat{p}=1.0$), their neural recruitment would drop by 55% while maintaining a constant feedback variable. Thus a large ratio b/a observed for any given patient from a variety of postures can be used to determine which patients might benefit from the use of constant recruitment feedback control such as I-V feedback loop control, which better maintains constant recruitment rather than maintaining constant voltage across postures.

Further embodiments of the present disclosure provide for multidimensional histogram construction, storage and analysis. In a closed loop feedback SCS system, every time a stimulus is delivered by the system the body's neural response is recorded. In some configurations, the response is used by a control loop to adjust the stimulus to maintain therapy. In order to measure and track the therapy and loop behaviours, the response signal and control variable(s) can be recorded.

In implanted applications, recording all values of these signals can be impractical, because the storage space and/or transmission speed may be limited. In a typical SCS implant, it is impossible to record all stimulus and response values, for example because the patient typically visits a technician infrequently and the time to download the data at the rates allowed by transcutaneous communication would greatly exceed the technician visit time.

The present embodiment thus provides a solution by performing statistical analysis on the data streams, thus recording a useful summary of the data and discarding the excessive quantities of raw data. This solution is to use a two-dimensional histogram to efficiently store a more useful representation of the raw data. To illustrate this approach, a patient model was constructed which simulates a typical SCS patient. A feedback loop comprising a constant-voltage controller was fitted to the patient. The controller adjusts the stimulus current in order to achieve a constant response voltage.

Figure 14:
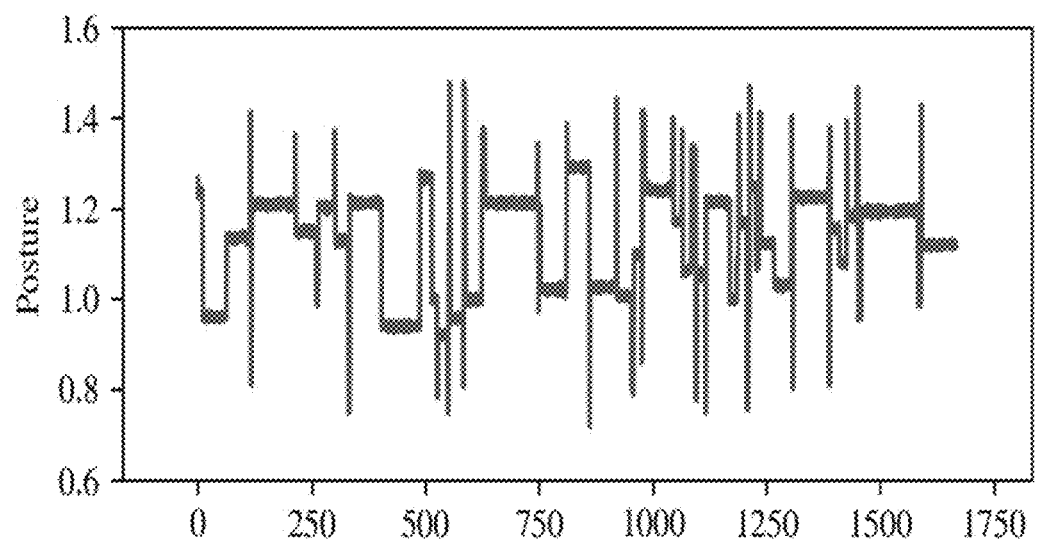
FIG. 14 illustrates a modelled patient's posture during a simulation of spinal cord stimulation.

FIG. 14 illustrates the modelled patient's posture during the simulation. The posture value is an electrode-to-fibre distance, relative to the patient's reference posture, as discussed in the preceding. The model changes the posture periodically, according to a Markov process: it will stay in each posture for a period, before moving to another. Two likely postures are in the middle of the range, and two unlikely postures are at the extremes. The actual posture on each change is chosen with a small amount of noise. Continuous white noise is also added to the posture signal. The posture waveform is low-pass filtered with a corner frequency of 3 Hz.

Figure 15A:
FIG. 15a depicts a one-dimensional histogram of stimulus current values arising over a large number of stimulus cycles.
Figure 15B:
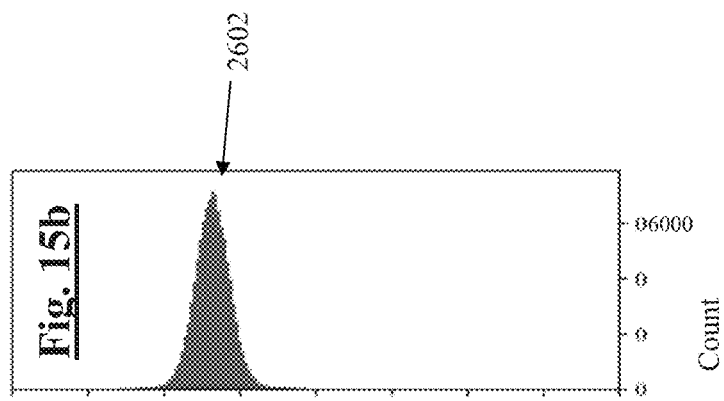
FIG. 15b depicts a one-dimensional histogram of ECAP voltage observations over the same period.

The control loop for such posture variations was also simulated. The stimulus current and response voltage were recorded on each timestep. A one-dimensional histogram of the stimulus current values arising over a large number of stimulus cycles is shown in FIG. 15*a*, and a one-dimensional histogram of voltage is shown in FIG. 15*b*. The control loop acts to maintain the response voltage at a substantially constant level 2602. The current histogram of FIG. 15*a* can be observed to contain multiple peaks which reflect the changes in posture. However, such one-dimensional histograms decouple the relationship between current and voltage for any given stimulus, and thus carry insufficient information for a range of real-time analyses or post-analyses as described elsewhere herein.

Figure 16:
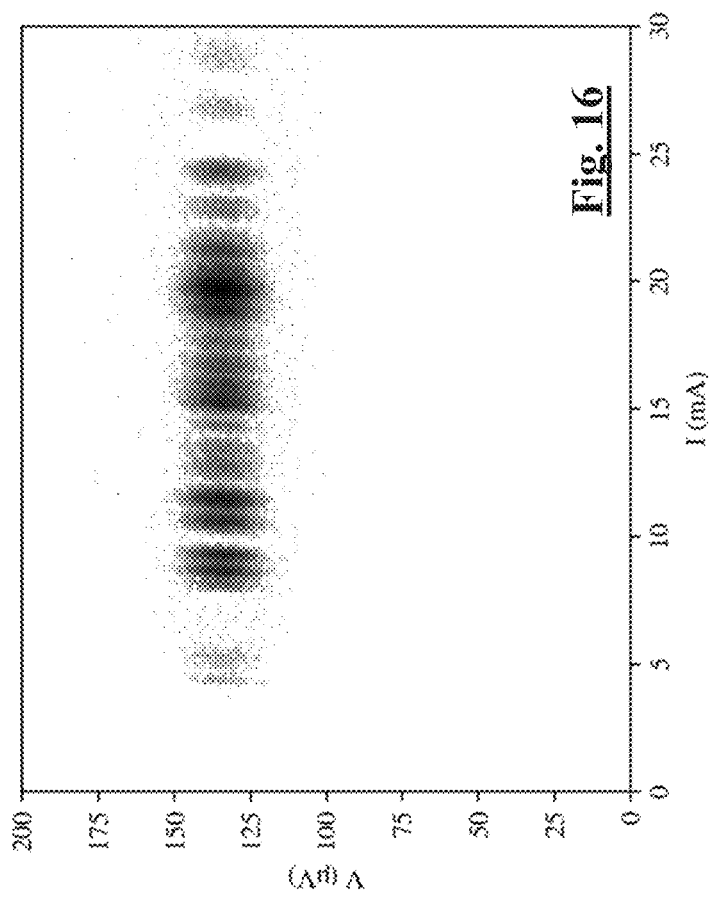
FIG. 16 is a two-dimensional histogram compiled from multidimensional data sets, each comprising a stimulus current datum and an ECAP voltage datum.

Instead, the present embodiment recognises that much more information is carried in a two-dimensional histogram, while still offering an efficient means of data storage. FIG. 16 is a two-dimensional histogram compiled from multidimensional data sets each comprising both stimulus current and voltage. Because the feedback loop is configured to use constant-voltage control the voltage data is predominantly in the range 125-140 μV, while the current data is grouped by posture at differing current values. To this extent, the two-dimensional data of FIG. 16 corresponds to the one-dimensional data of FIGS. 15*a* and 15*b*, which are positioned in alignment with and adjacent to FIG. 16 for illustrative purposes.

However, storage of the two-dimensional histogram data shown in FIG. 16 provides a number of important advantages and distinctions over one-dimensional histograms.

It is noted that the storage space required to store a bins of current data and b bins of voltage data is (a+b) for one-dimensional histograms, and is (a×b) for a two-dimensional histogram. However, for extended periods of operation in which thousands or even millions of stimulus cycles occur, the two-dimensional histogram still presents a highly reduced form of data storage as compared to raw data storage. Moreover, the two-dimensional histogram allows a great deal more insight into the device operation and patient responses and movements.

For example, in FIG. 16 the system start-up is identifiable as being the dots leading right and then up from the origin, whereby the controller current starts at zero and increases until the setpoint is achieved.

Further, the discrete postures inhabited by the patient are clearly visible as sub-areas of high intensity in this particular histogram. The vertical variation (voltage variation) observed within each posture is due to noise, as the feedback loop is seeking constant voltage. The surrounding speckle of points are states passed through when moving from one posture to another; these can be further distinguished by other data such as their phase-plane velocity, if such data is recorded. The extent of this transient region provides an indicator of how far the system moves from the set-point during posture changes, which can be used as a measure to guide improvements in loop design.

The two-dimensional histogram of FIG. 16 has a grid of bins, with one axis for current and another for voltage. This records information on the relationship between the two values. This requires more storage than a one-dimensional histogram, but the increase is typically insignificant compared with recording real-time data. In this case, the histogram can be post-processed on a computer, with unlimited computing power and knowledge of the latest patient parameters, in order to extract information on posture and recruitment.

The correlation between voltage and current is just one example of information that is lost in one-dimensional histograms. The time course of the various signals can also be informative; for example, the system behaviour is affected by the patient's posture changes but also by noise. These can be distinguished by further derived signals, for example, the frequency content of one of the signals, or by the direction and/or velocity of the system state in the current/voltage phase plane. These can be recorded in a two-dimensional histogram, such as current vs. frequency content.

Higher-dimensional histograms can also be used. The current and voltage measured on a stimulus defines a point in the current-voltage plane. The direction and/or rate of change of this point, from stimulus to stimulus, can be calculated and recorded. By comparing the point to the previous stimulus' point, a direction vector can be calculated. The angle of this direction vector can then be quantized, and a three-dimensional histogram stored, with axes current, voltage, and angle. Or, a four-dimensional histogram could contain current, voltage, and the two components of the direction vector. This directional information captures information about the time evolution of the system state, which can later be used for discriminating events.

Figure 17:
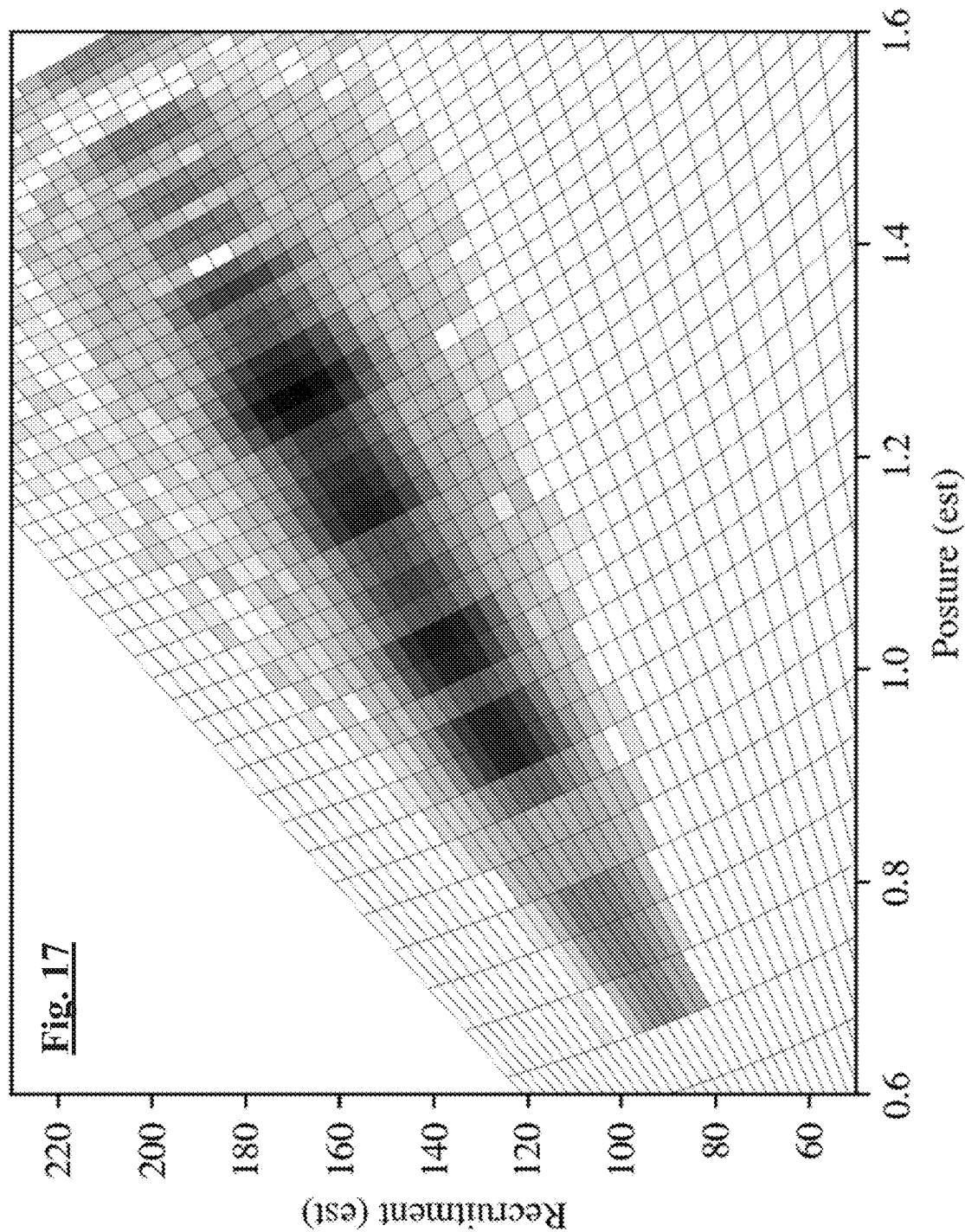
FIG. 17 is a two-dimensional histogram of the current vs. voltage data of FIG. 16 when warped into axes of posture vs. recruitment, at reduced resolution.

A further embodiment could calculate posture and/or recruitment on the fly inside the implant, in the manner discussed hereinbefore, and then could additionally or alternatively store a histogram of these calculated values. For example, the method described herein to convert current and voltage data into posture and recruitment data could be used as transformations to warp the corners of the histogram bins from the current/voltage plane to a posture/recruitment plane. FIG. 17 is a two-dimensional histogram of current vs. voltage, warped into axes of posture vs. recruitment. This histogram is of the same data as FIG. 16 but is of reduced resolution to better illustrate the warping effect as shown by the warped grid of bins.

Figure 18:
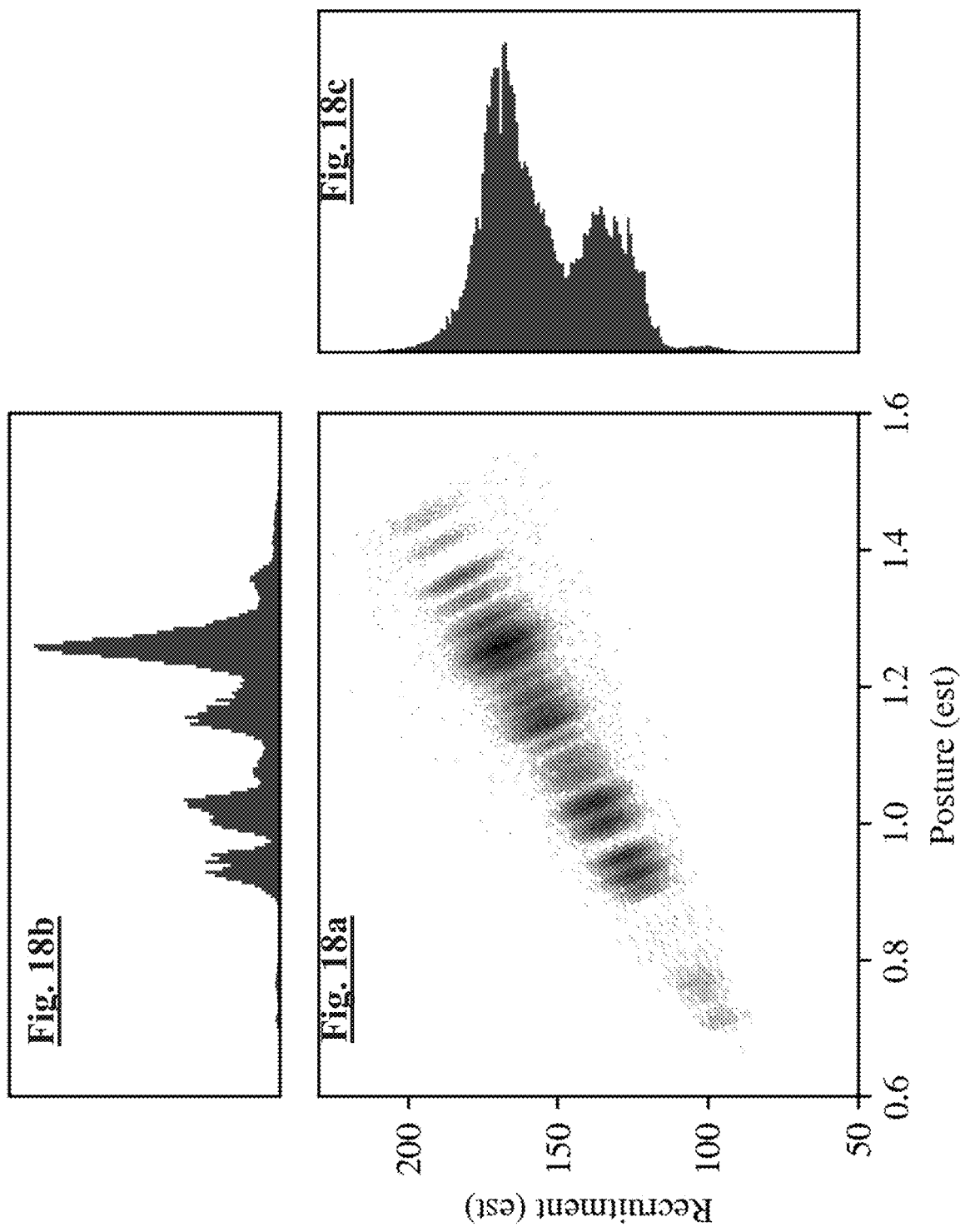

The warped histogram can then also be used to produce histograms of the patient's posture and recruitment during the experiment, as shown in FIG. 18. In particular, FIG. 18a shows the posture/recruitment histogram data of FIG. 17, but at full resolution. A one-dimensional histogram of posture can be extracted as shown at FIG. 18b. A one-dimensional histogram of recruitment can be extracted as shown at FIG. 18c.

In this case, the result demonstrates that the patient's neural recruitment varies significantly with posture. This is as expected for a constant-voltage feedback loop, as explained more fully in WO2017173493.

Figure 19:
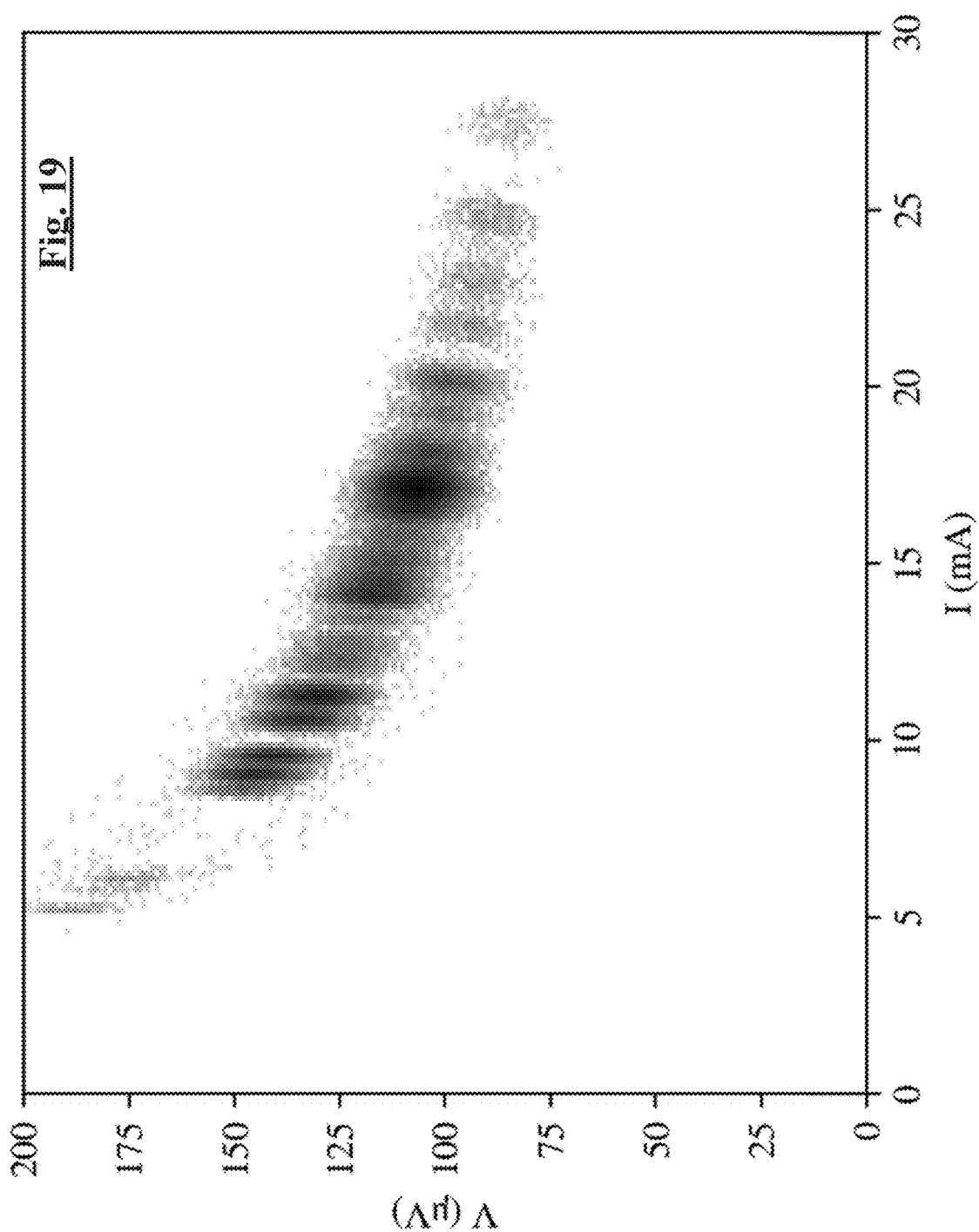
FIG. 19 is a two-dimensional histogram of current vs. voltage data obtained when using an I-V feedback loop controller.

The experiment was repeated with an identical posture sequence, as shown in FIG. 14, but using a feedback loop controller which uses I-V control so as to seek constant neural recruitment, rather than constant voltage. The resulting current-voltage histogram is shown in FIG. 19. Once again, the current-voltage two-dimensional histogram of FIG. 19 can be converted to a recruitment-posture two-dimensional histogram, by warping the corners of the histogram bins from the current/voltage plane to a posture/recruitment plane, as shown in FIG. 20a. Moreover, the warped histogram of FIG. 20a can be used to derive a one-dimensional posture histogram (FIG. 20b) and a one-dimensional recruitment histogram (FIG. 20c). In FIGS. 20a and 20c, the constant-recruitment loop behaviour is clearly visible, whereby neural recruitment is maintained at or close to a constant level 3102 even though the patient has adopted several different postures throughout the experiment, as is desired.

Despite the very different source histograms arising from the two types of feedback loop (constant voltage in FIG. 16, constant recruitment in FIG. 19), the estimated postures are very similar, as can be seen by comparing the posture histogram of FIG. 18b to the posture histogram of FIG. 20b. This is expected because in each experiment the patient was asked to assume the same postures, and thus serves as a verification of each approach.

This information would not be captured in one-dimensional histograms, as the spread of voltage would be larger with the constant recruitment control loop, despite its improved performance at achieving constant neural recruitment.

Figure 20:
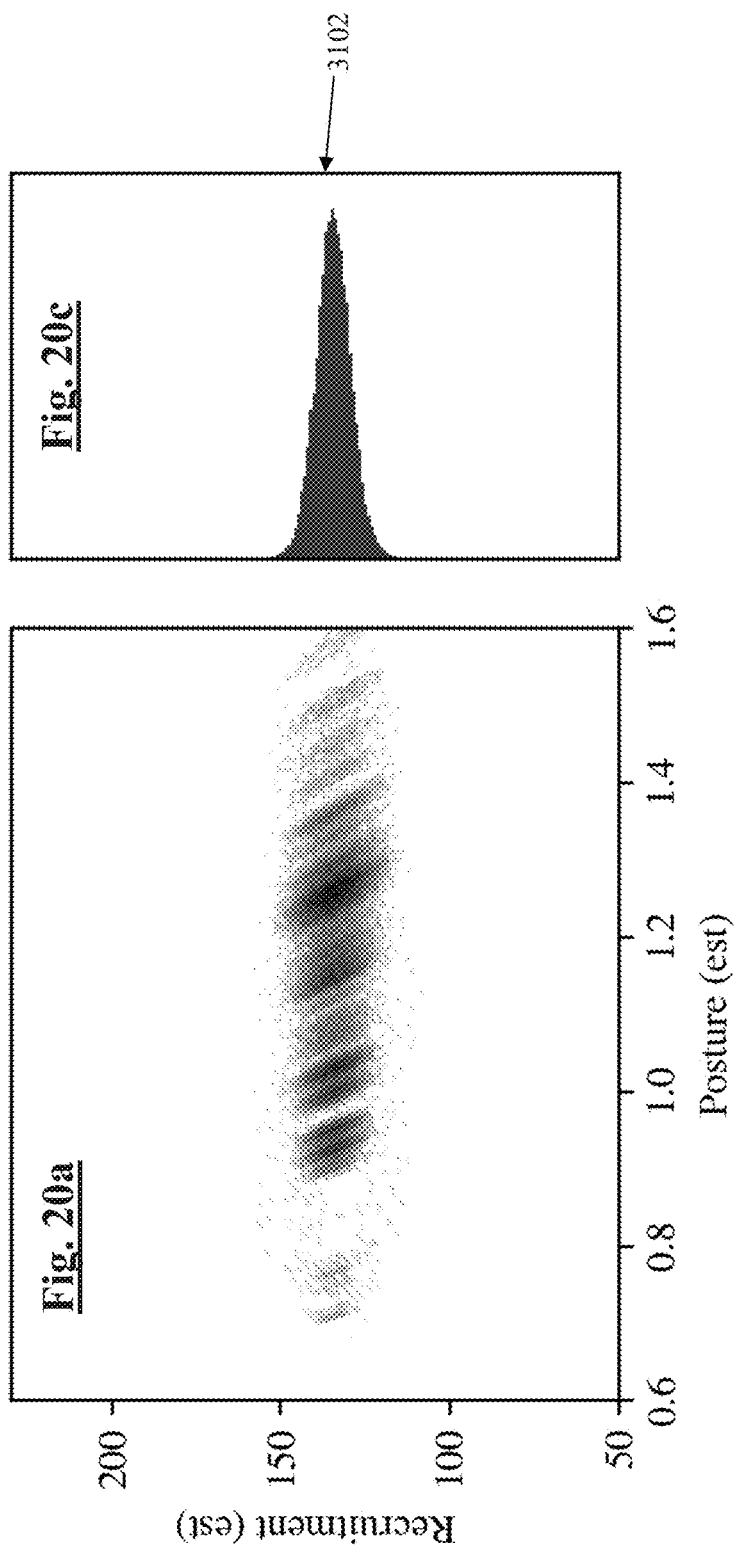

Notably, various embodiments of the invention provide for posture determination and/or neural recruitment determination, whether the implant is operating in an open loop mode (see FIG. 13), a closed loop feedback mode utilising constant voltage control (FIGS. 16, 17, 18), or a closed loop feedback mode utilising constant recruitment control (FIGS. 19, 20).

In other implementations, a two-dimensional histogram may be compiled from a multidimensional data set other than current vs voltage or posture vs recruitment. For example, the multidimensional data set may comprise ECAP amplitudes sensed at the same time on two different electrode pairs. Alternatively, the multidimensional data set may comprise two different parameters from the same ECAP, e.g. latency and amplitude. Alternatively, the multidimensional data set may comprise ECAP parameters that are separated in time, e.g. ECAP amplitude at a certain time and ECAP amplitude some interval previous to that time.

Figure 26:
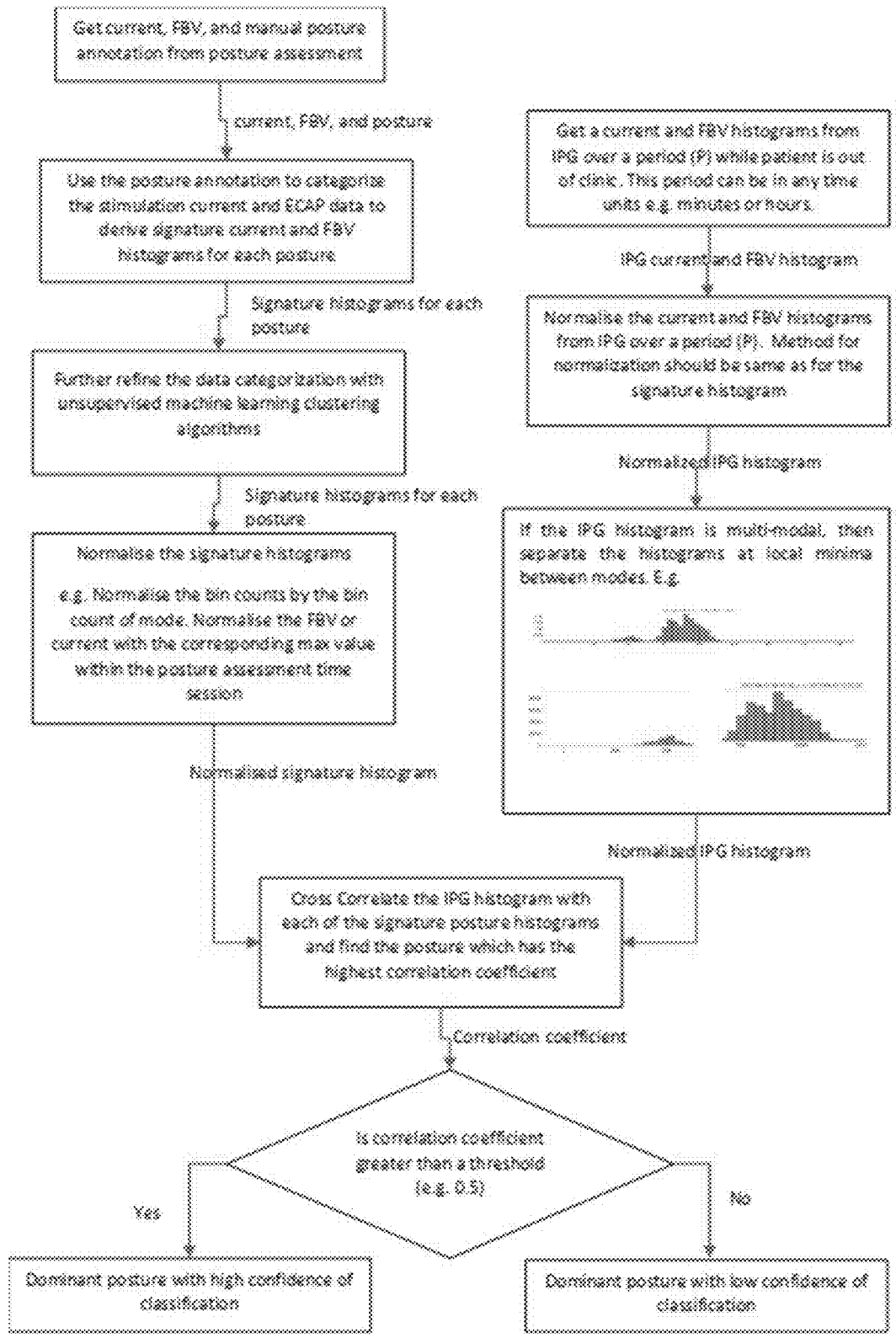
FIG. 26 is a flow chart illustrating clinical derivation of normalised signature histograms for each posture, and the use of such signature histograms to classify posture from out of clinic data.

A further embodiment of this disclosure resides in a method and system for automated posture determination from a clinical data histogram, whether a univariate (one-dimensional) histogram, or a multidimensional histogram. In this embodiment, stimulation current data collected during the usual posture assessment stage of clinical fitting is used to form a set of "signature histograms", each being characteristic of one respective posture, and each being specific for the individual patient concerned. One embodiment to this effect is shown in FIG. 26, discussed further in the following. However alternative embodiments may identify a patient's posture via a number of analytical approaches without use of a "signature histogram". For example, calculation of ongoing statistics such as mean, variance, skew etc. of IPG current or voltage levels could allow accurate identification of a posture without a histogram ever being constructed, in such embodiments.

Then, during day to day or field use of the implant, one or more postures of a subject over a period can be estimated by identifying the most correlating signature histogram(s) to the histogram collected over that period.

One of the applications of automatic posture estimation is to be able to automate the change in programming and stimulation setting based on patient's posture. For example, currently some patients have two different stimulation settings for awake activity and sleep. The patient uses a hand-held remote control to change from a stimulation setting for awake to another stimulation setting for sleeping. With the automated posture estimator, the change in stimulation setting can be automated based on whether they are in supine or other posture.

Figure 21:
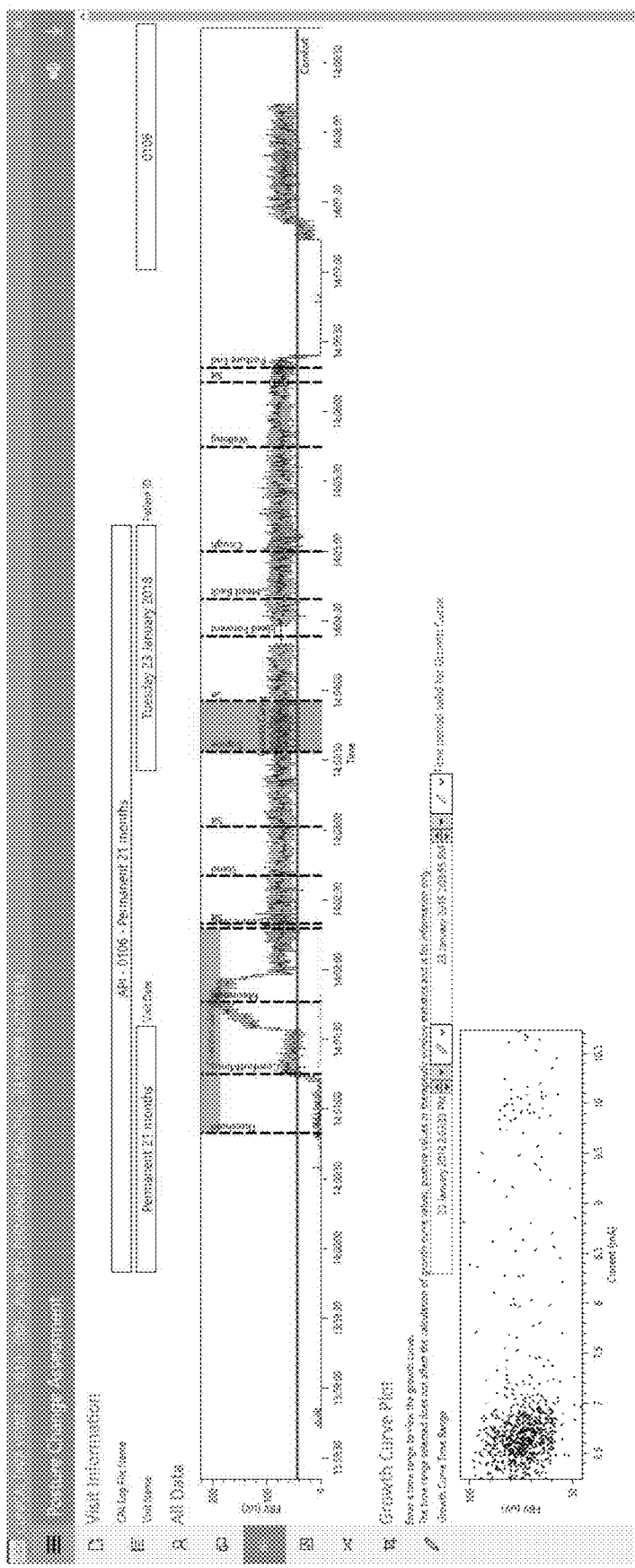
FIG. 21 illustrates a graphical user interface of a clinical data viewer application, when gathering clinical data to configure a neurostimulator for automatic posture estimation.

To this end, patients are asked to perform various postures in the clinic. During this posture assessment the observed ECAP amplitude and posture are recorded as shown in FIG. 21, along with the stimulus current (not shown).

Figure 22:
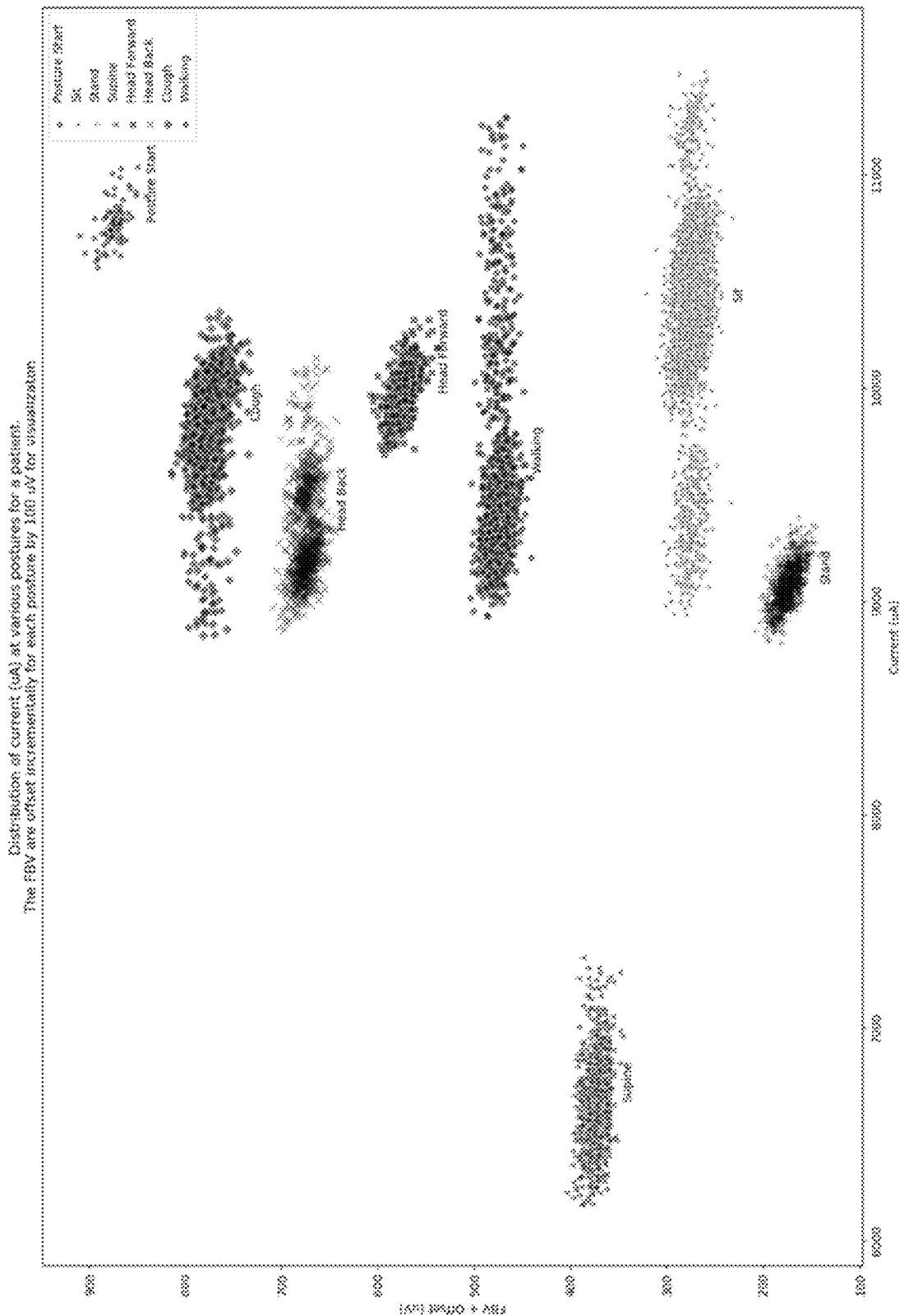
FIG. 22 illustrates the distribution of data obtained in each posture, separated by arbitrary offset for visualisation.

The present embodiment recognises that the distribution of the stimulus current for most postures has distinct characteristics that allows them to be differentiated from each other. FIG. 22 shows how the position and distribution of current under supine posture in x-axis is very different from the sitting posture. Also the distributions of current during walking and standing are very distinct from each other. FIG. 22 includes a unique vertical offset applied to data from each posture, for clear visual separation of the groupings of data under each posture. Live data will not include such an offset, however the pre-identified posture signature histograms can then be correlated against observed data to identify which posture most closely corresponds to live observed data.

Figure 23A:
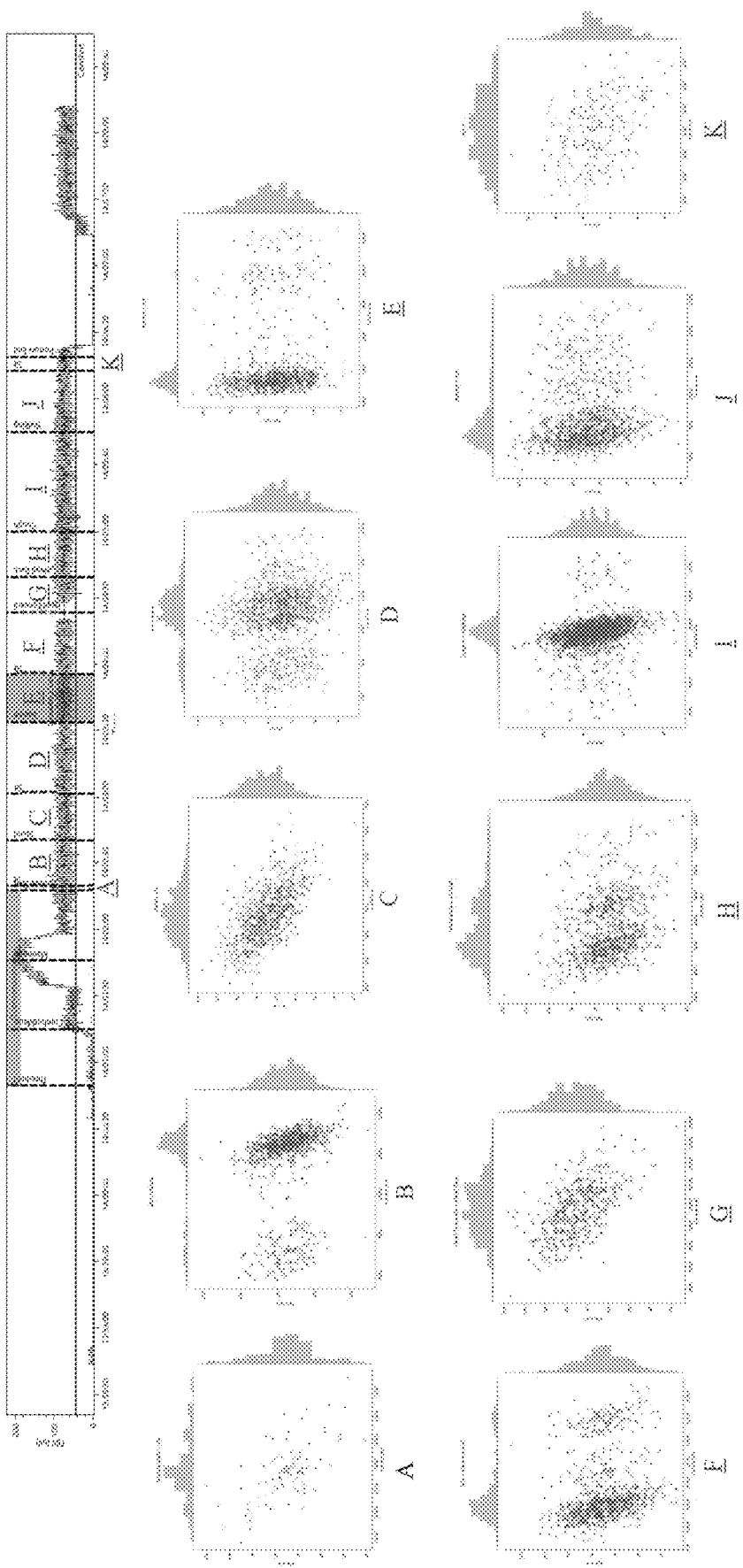
FIG. 23a illustrates pre-identified signature current-histograms for each posture.
Figure 23B:
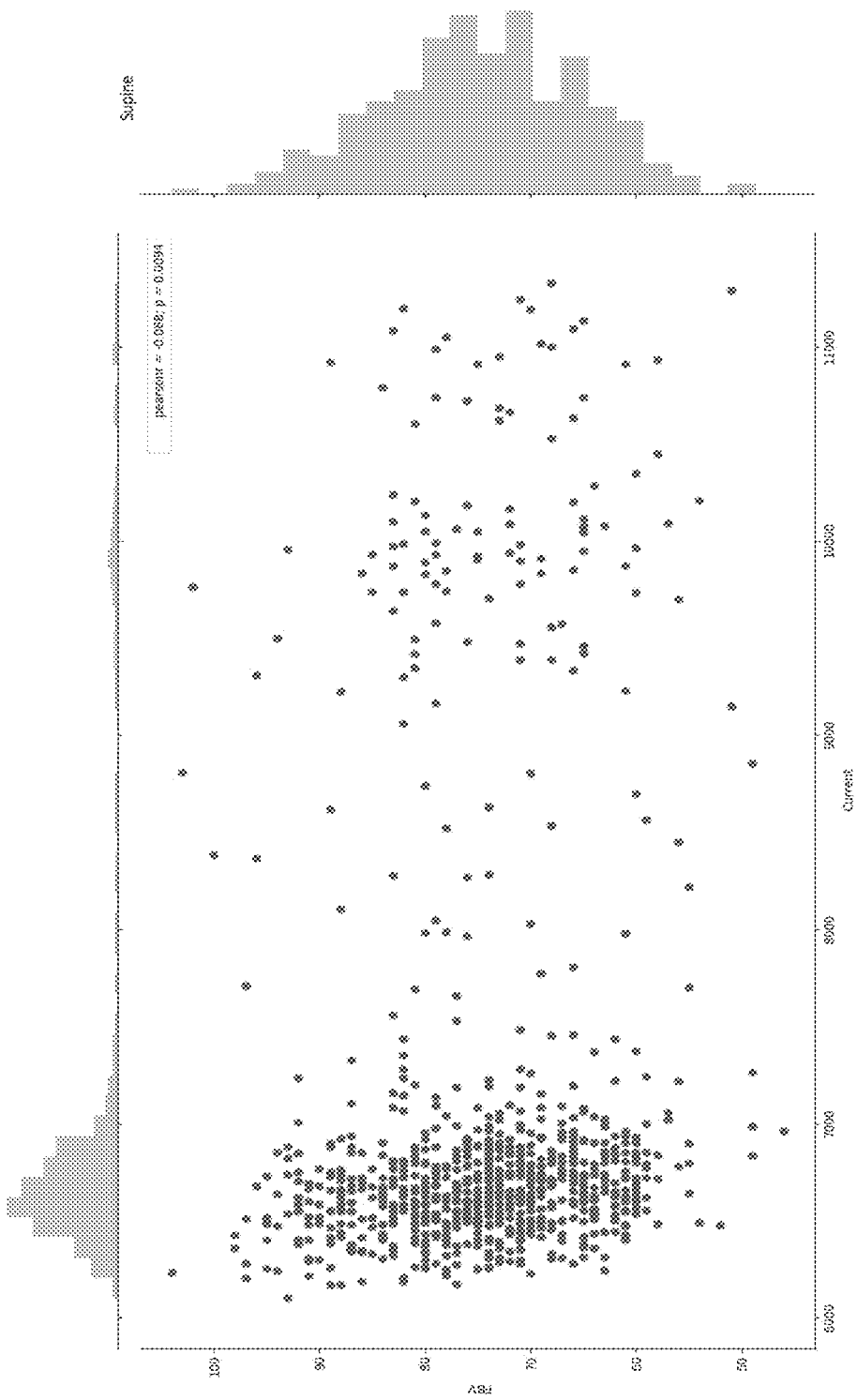
FIG. 23b is an enlarged view of the pre-identified signature current-histogram for the supine posture.

For each posture tested in the clinical setting we can derive a pre-identified signature current-histogram, of which some are shown in FIG. 23a. In particular, the upper portion of FIG. 23a plots the time sequence of data obtained while the patient adopted a series of differing postures, denoted A, B, . . . . K. The current/FBV scatter plot obtained during each such posture is then presented in the central and lower portions of FIG. 23a. FIG. 23b is an enlarged view of the pre-identified signature current-histogram for data largely obtained while the patient was in the supine posture. Specifically, a majority of data points are seen to be clustered towards the left side of the scatter plot, between about 6000-8000 µA current, during the supine posture. The smaller number of data points outside this cluster represent posture transition.

Figure 24:
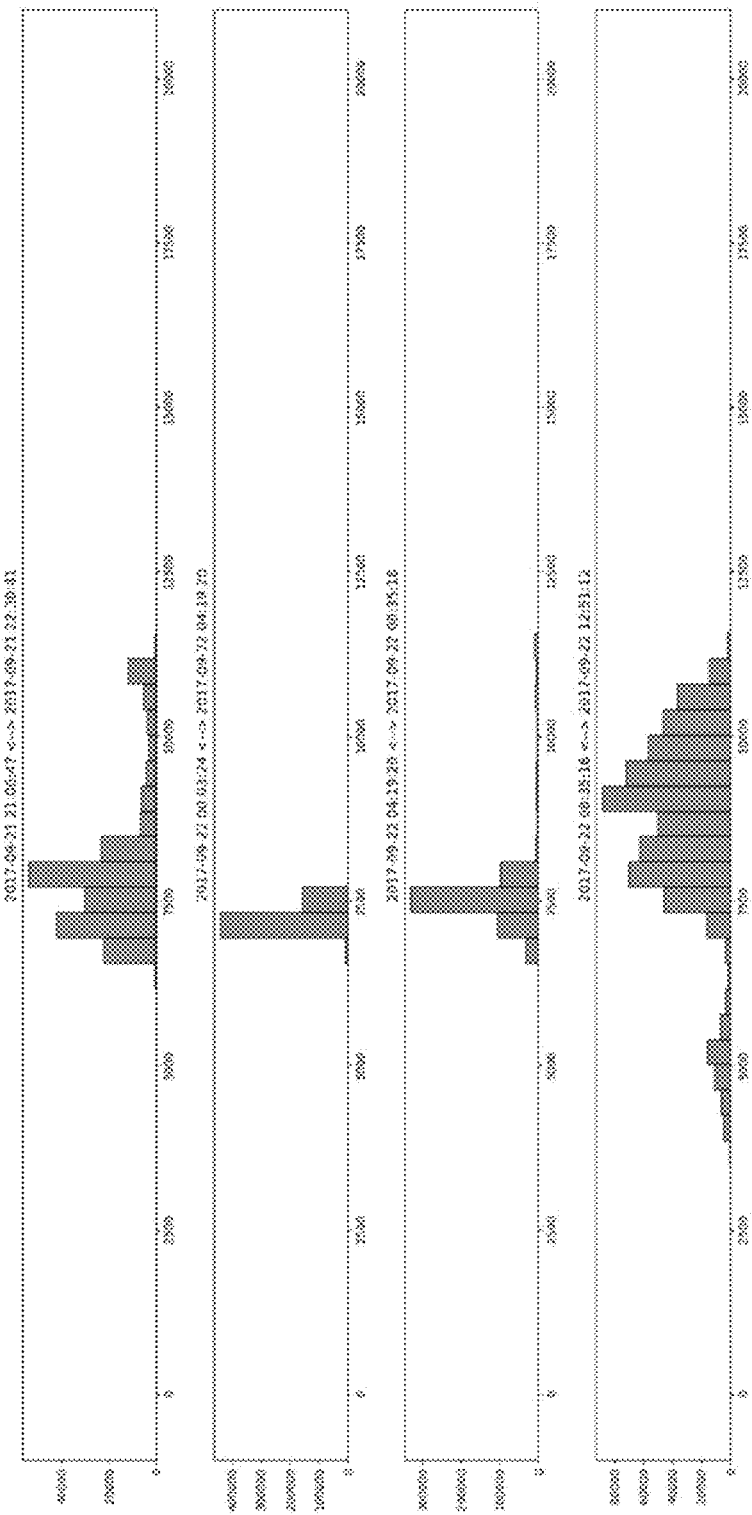
FIG. 24 illustrates current histograms obtained over different time periods for the purpose of posture identification.

Then, during day to day usage, we can correlate each signature current histograms with the observed periodic histograms, to estimate the patient's dominant posture during that period. FIG. 24 shows the current histogram from 9 pm to next day 12 pm, split into four time blocks. As expected, the current histogram between 12 am and 8:35 am (in the 2nd and 3rd rows) match with the supine signature histogram, suggesting the patient was lying down in bed during this time. Also the histogram in the 4th row shows that there are components that match both the supine and standing signature histograms, again as would be expected in the morning between 8:35 am and 12 pm. The device may use such data to alter a mode of operation, such as by switching between a "day" program and a "sleep" program. This may also consider the time of day so that the device switches to a "sleep" program only after 8 PM, for example.

Note that the histograms of FIG. 24 are obtained over the course of hours, however during field use the histograms assessed may be of any suitable time period, and for example may be of the order of seconds, or minutes. Constraining the histograms to smaller periods makes it more likely that the patient will only have one posture, or one dominant posture, during that period, potentially easing data analysis.

The signature histograms should preferably be normalised for both current and time, noting that a longer observation time results in more counts per bin, and that a higher or lower patient setpoint will result in the histogram being "moved" to the left or right. Thus, knowledge of patient setpoint can be used by the device to slide the signature histogram to the left or right as appropriate for correlation with the live data.

Unsupervised machine learning may also be applied to clinical generation of the signature histograms and/or for post-processing of recorded field data, to identify postures.

Figure 25A:
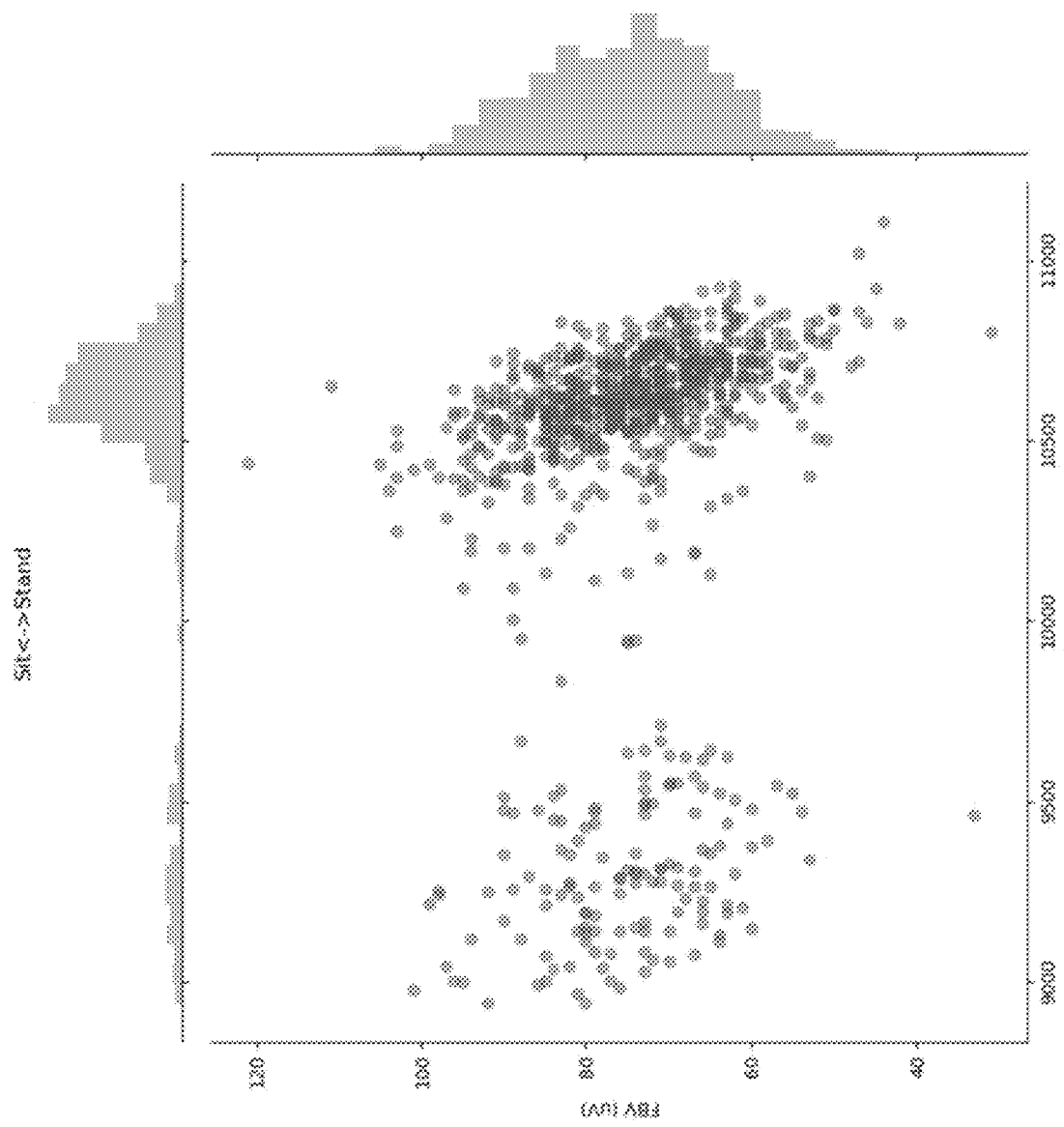
FIG. 25a illustrates a data cluster obtained for a single time period.
Figure 25B:
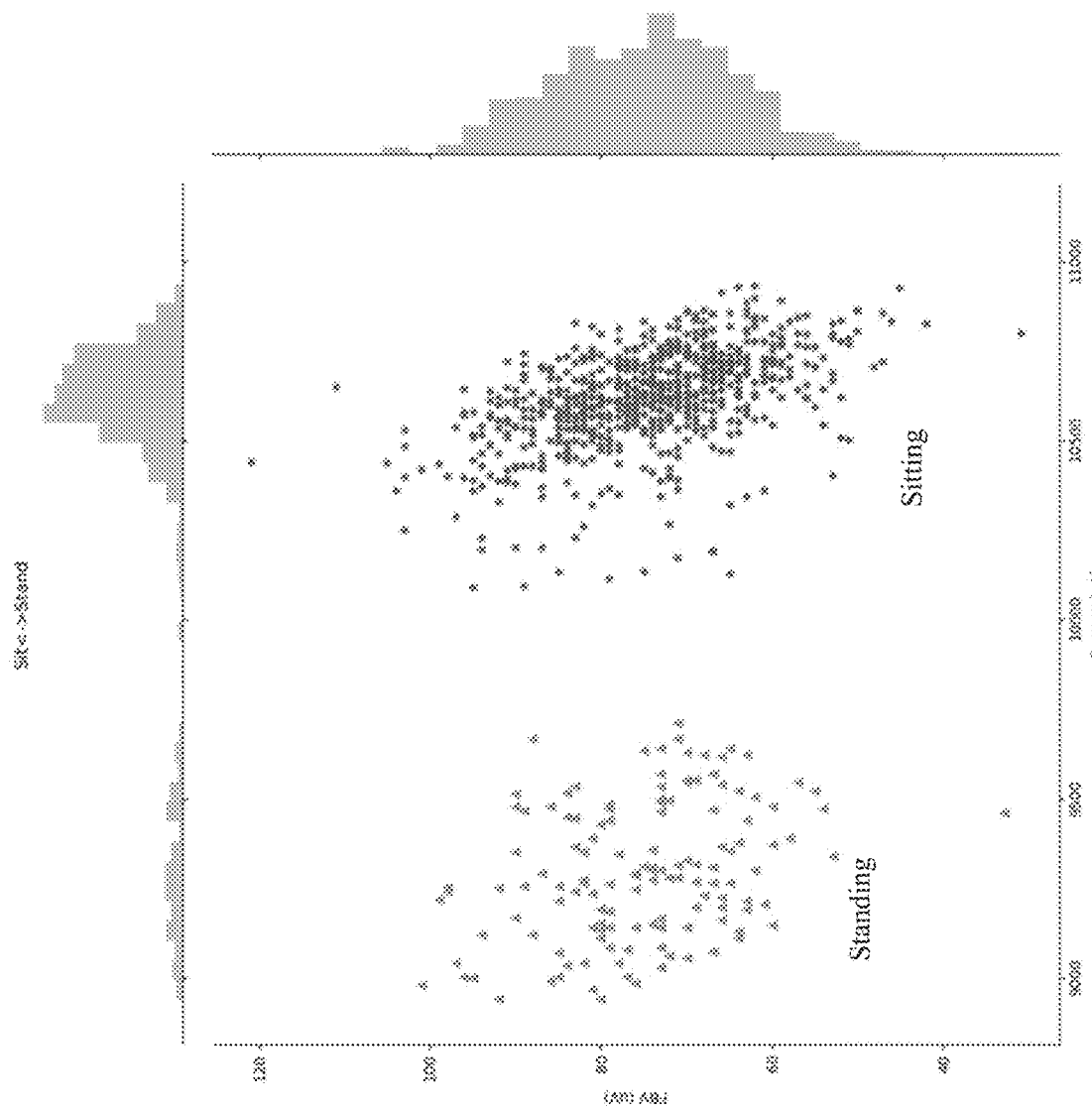
FIG. 25b illustrates classification of the data of FIG. 25a into two distinct postures.

Returning to FIG. 23a, it is noted how some of the plots have 2 clusters of data separated by current values representing the two different postures. This is because during the clinical process data from multiple postures may sometimes be present in a "single" posture, due to poor annotation timing as a result of manual posture change annotation by the clinician. Usually the large cluster is the data collected during the main posture and the smaller cluster is the data of the transiting posture. For example, in FIG. 25a, the bigger cluster on the right side of the scatter plot represents the data during sitting posture, and the smaller data cluster represents the standing posture. Accordingly cluster detection can be applied to clean the signature histograms, as shown in FIG. 25b, in which data points identified by cluster detection as arising from the sitting posture are marked as stars, and data points identified by cluster detection as arising from the standing posture are indicated by triangles.

FIG. 26 is a flow chart illustrating clinical derivation of normalised signature histograms for each posture, and the use of such signature histograms to classify posture from out-of-clinic data, such as during everyday normal use. In general, this process and other variants may in accordance with the present invention seek to use IPG-based therapy details to classify the posture that a patient is in, and to accordingly adjust therapy delivered. For example, while one step in the flow-chart is to refine the data categorisation with machine learning clustering algorithms and output a signature histogram for each posture, alternative embodiments may use other means to produce such an output.

While diagrammatic representations of histograms are presented herein to aid understanding of embodiments of the invention, it is to be understood that a "histogram" as defined herein is to be understood as encompassing embodiments which comprise data representing a histogram, whether or not a diagrammatic representation of such histogram data is ever produced.

The sensing and measurement of the ECAP signals are described in relation to the spinal cord, for example in the thoracic, thoracolumbar or cervical regions. In other embodiments the stimuli may be applied to, and/or ECAPs may be recorded in, other locations besides the spinal cord, such as peripheral nerves, or within the brain.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not limiting or restrictive.

The invention claimed is:

1. An implantable device for controllably applying a neural stimulus, the device comprising:
   a plurality of electrodes including one or more stimulus electrodes and one or more sense electrodes;
   a stimulus source for providing a stimulus to be delivered from the one or more stimulus electrodes to a neural pathway of a patient in order to give rise to an evoked action potential on the neural pathway;

measurement circuitry for recording a neural compound action potential signal sensed at the one or more sense electrodes; and a control unit configured to:
control application of a neural stimulus as defined by a stimulus parameter;
measure via the measurement circuitry a characteristic of a neural compound action potential response evoked by the stimulus;
compute, using the stimulus parameter and the measured characteristic of the evoked neural compound action potential response, a characteristic of an evoked response that would be obtained from the neural stimulus if the patient were in a reference posture; and
estimate a posture of the patient from the computed characteristic.

2. The implantable device of claim 1, wherein the estimate of posture comprises a ratio of a measured amplitude of the neural compound action potential response to the computed characteristic, the computed characteristic comprising an amplitude of an evoked response that would be obtained from the neural stimulus if the patient were in the reference posture.

3. The implantable device of claim 1, wherein the control unit is further configured to:
implement, using the computed characteristic as a feedback variable, a feedback controller which completes a feedback loop, the feedback controller configured to control the stimulus parameter so as to maintain the feedback variable at a setpoint.

4. The implantable device of claim 3, wherein the feedback controller is configured to use the estimate of posture to control the stimulus parameter.

5. The implantable device of claim 3, wherein the feedback controller is configured to use the estimate of posture to estimate a distance between the electrodes and the neural pathway.

6. The implantable device of claim 5, wherein the feedback controller is configured to estimate the distance by scaling the estimate of posture by the distance between the electrodes and the neural pathway in the reference posture.

7. The implantable device of claim 1, wherein the control unit is further configured to:
implement, using the measured characteristic as a feedback variable, a feedback controller which completes a feedback loop, the feedback controller configured to control the stimulus parameter so as to maintain the feedback variable at a setpoint.

8. The implantable device of claim 1, wherein the control unit is further configured to determine a variation in recruitment across postures from the posture estimate.

9. The implantable device of claim 1, wherein computing the characteristic comprises solving $C=(\hat{V}/M_0+T_0)^k \hat{V}$ for $\hat{V}$, where $\hat{V}$ is the computed characteristic and comprises a computed amplitude, $C=I^k V$, I is the stimulus parameter, V is the measured characteristic of the evoked neural compound action potential response, and $M_0$ and $T_0$ are parameters of a growth curve of the patient in the reference posture.

10. An automated method of controlling a neural stimulus, the method comprising:
applying the neural stimulus to a neural pathway of a patient in order to give rise to an evoked action potential on the neural pathway, the stimulus being defined by a stimulus parameter;
measuring a characteristic of a neural compound action potential response evoked by the stimulus;
computing, using the stimulus parameter and the measured characteristic of the evoked neural compound action potential response, a characteristic of an evoked response that would be obtained from the neural stimulus if the patient were in a reference posture; and
estimating a posture of the patient from the computed characteristic.

11. The method of claim 10, wherein the estimate of posture comprises a ratio of a measured amplitude of the neural compound action potential response to the computed characteristic, the computed characteristic comprising an amplitude of an evoked response that would be obtained from the neural stimulus if the patient were in the reference posture.

12. The method of claim 10, further comprising:
implementing, using the computed characteristic as a feedback variable, a feedback controller which completes a feedback loop, the feedback controller configured to control the stimulus parameter so as to maintain the feedback variable at a setpoint.

13. The method of claim 12, further comprising using, by the feedback controller, the estimate of posture to control the stimulus parameter.

14. The method of claim 10, further comprising:
implementing, using the measured characteristic as a feedback variable, a feedback controller which completes a feedback loop, the feedback controller configured to control the stimulus parameter so as to maintain the feedback variable at a setpoint.

15. The method of claim 10, further comprising determining a variation in recruitment across postures from the posture estimate.

16. The method of claim 10, wherein computing the characteristic comprises solving $C=(\hat{V}/M_0+T_0)^k I$ for $\hat{V}$, where $\hat{V}$ is the computed characteristic and comprises a computed amplitude, $C=I^k V$, I is the stimulus parameter, V is the measured characteristic of the evoked neural compound action potential response, and $M_0$ and $T_0$ are parameters of a growth curve of the patient in the reference posture.

* * * * *